United States Patent [19]

Frank et al.

[11] Patent Number: 5,202,742

[45] Date of Patent: Apr. 13, 1993

[54] LASER RADAR FOR A VEHICLE LATERAL GUIDANCE SYSTEM

[75] Inventors: Andrew A. Frank, El Macero, Calif.; Masahiko Nakamura, Ann Arbor, Mich.

[73] Assignee: Aisin Saiki Kabushiki Kaisha, Japan

[21] Appl. No.: 592,235

[22] Filed: Oct. 3, 1990

[51] Int. Cl.⁵ .................. G01C 3/08; G01C 1/00; G01B 11/26; B60T 7/16

[52] U.S. Cl. ...................... 356/5; 180/167; 180/169; 356/141; 356/152

[58] Field of Search .................. 356/5, 141, 152; 180/167, 168, 169

[56] References Cited

U.S. PATENT DOCUMENTS

| H341 | 10/1987 | Mongeon . | |
|---|---|---|---|
| 3,172,496 | 3/1965 | Rabinow et al. . | |
| 3,619,618 | 11/1971 | Haar et al. . | |
| 3,708,668 | 1/1973 | Tilley . | |
| 3,802,780 | 4/1974 | Helm et al. . | |
| 3,881,568 | 5/1975 | Ando et al. . | |
| 3,918,172 | 11/1975 | Moreau . | |
| 3,970,840 | 7/1976 | De Bruine . | |
| 4,007,991 | 2/1977 | Robertsson . | |
| 4,019,060 | 4/1977 | Woodman | 250/461 |
| 4,049,961 | 9/1977 | Marcy . | |
| 4,069,888 | 1/1978 | Wolters et al. . | |
| 4,099,591 | 7/1978 | Carr . | |
| 4,111,552 | 9/1978 | Bodlaj . | |
| 4,136,949 | 1/1979 | Hayamizu et al. . | |
| 4,168,908 | 9/1979 | Cubalchini . | |
| 4,184,767 | 1/1980 | Hughes et al. . | |
| 4,218,138 | 8/1980 | Robertsson . | |
| 4,225,226 | 9/1980 | Davidson et al. . | |
| 4,227,261 | 10/1980 | Robertsson . | |
| 4,227,807 | 10/1980 | Pond et al. . | |
| 4,279,036 | 7/1981 | Pfund | 356/152 |
| 4,313,654 | 2/1982 | Matsui et al. . | |
| 4,349,277 | 9/1982 | Mundy et al. . | |
| 4,355,895 | 10/1982 | Cairns et al. | 356/141 |
| 4,373,804 | 2/1983 | Pryor et al. . | |
| 4,383,238 | 5/1983 | Endo . | |
| 4,387,988 | 6/1983 | Matsuda et al. . | |
| 4,395,121 | 7/1983 | Nory et al. . | |
| 4,419,011 | 12/1983 | Matsuda et al. . | |
| 4,425,043 | 1/1984 | van Rosmalen . | |
| 4,436,418 | 3/1984 | Morino . | |
| 4,441,810 | 4/1984 | Momose et al. . | |
| 4,443,103 | 4/1984 | Erdman et al. . | |
| 4,445,029 | 4/1984 | Nagaoka et al. . | |

(List continued on next page.)

FOREIGN PATENT DOCUMENTS

0361914A2  4/1990  European Pat. Off. .

OTHER PUBLICATIONS

"On Lateral Control of Highway Vehicles Guided By A Forward Looking Sensor" by Sijiu M. Liu and Andrew A. Frank, Department of Mechanical Engineering, pp. 1–6.

"Wire-Reference Configurations In Vehicle Lateral Control" by Karl W. Olson, IEEE Transactions on Vehicle Technology, vol. VT-26, No. 2, May 1977, pp. 161–172.

"Adaptive Steering" by J. T. Kasselmann and T. W. Keranen, pp. 26–35.

"Steering Controller Design For Automated Guideway Transit Vehicles" by S. E. Shladover, D. N. Wormley, H. H. Richardson, and R. Fish, Journal of Dynamic (List continued on next page.)

Primary Examiner—Stephen C. Buczinski
Attorney, Agent, or Firm—Banner, Birch, McKie & Beckett

[57] ABSTRACT

A laser radar apparatus for producing a pulse modulated transmitted light beam and receiving reflected light beams from road mounted retroreflectors. In the preferred embodiment, a floodlight beam illuminates a portion of a roadway from 20 to 150 in front of a vehicle. Reflected beams from retroreflectors mounted in the roadway are received by the radar unit which calculates distance D and angle θ between the laser radar apparatus and each retroreflector. Distance D is calculated by measuring the propagation delay of the pulse modulated light beam. Angle θ data is indicated by measuring where on a receiver photodiode array the light beam is incident.

44 Claims, 18 Drawing Sheets

U.S. PATENT DOCUMENTS

| | | |
|---|---|---|
| 4,477,184 | 10/1984 | Endo . |
| 4,484,069 | 11/1984 | Brenholdt . |
| 4,486,095 | 12/1984 | Mitchelson . |
| 4,497,065 | 1/1985 | Tisdale et al. . |
| 4,498,768 | 2/1985 | Holl . |
| 4,511,248 | 4/1985 | Abbas . |
| 4,514,083 | 4/1985 | Fukuoka . |
| 4,515,471 | 5/1985 | Eden . |
| 4,515,472 | 5/1985 | Welch . |
| 4,538,907 | 9/1985 | Rocchi . |
| 4,552,456 | 11/1985 | Endo . |
| 4,556,313 | 12/1985 | Miller, Jr. et al. . |
| 4,566,032 | 1/1986 | Hirooka et al. . |
| 4,572,662 | 2/1986 | Silverman ............................ 356/5 |
| 4,573,547 | 3/1986 | Yoshimura et al. . |
| 4,575,237 | 3/1986 | Suzuki . |
| 4,580,250 | 4/1986 | Kago et al. . |
| 4,615,615 | 10/1986 | Krolak et al. . |
| 4,630,109 | 12/1986 | Barton . |
| 4,632,543 | 12/1986 | Endo ...................................... 356/5 |
| 4,644,146 | 2/1987 | Wurster . |
| 4,647,784 | 3/1987 | Stephens . |
| 4,652,107 | 3/1987 | Tamura . |
| 4,660,970 | 4/1987 | Ferrano . |
| 4,668,859 | 5/1987 | Winterer . |
| 4,673,817 | 6/1987 | Oomen . |
| 4,700,301 | 10/1987 | Dyke . |
| 4,703,240 | 10/1987 | Yoshimoto et al. . |
| 4,703,820 | 11/1987 | Reinaud . |
| 4,706,195 | 11/1987 | Yoshino et al. . |
| 4,716,298 | 12/1987 | Etoh . |
| 4,721,385 | 1/1988 | Jelalian et al. . |
| 4,727,492 | 2/1988 | Reeve et al. . |
| 4,729,660 | 3/1988 | Tsumura et al. . |
| 4,734,572 | 3/1988 | Gorman . |
| 4,752,964 | 6/1988 | Okada et al. . |
| 4,769,700 | 9/1988 | Pryor . |
| 4,770,526 | 9/1988 | Manhart et al. . |
| 4,788,439 | 11/1988 | Hardy et al. . |
| 4,790,402 | 12/1988 | Field et al. . |
| 4,796,198 | 1/1989 | Boultinghouse et al. . |
| 4,797,557 | 1/1989 | Ohman . |
| 4,811,228 | 3/1989 | Hyyppa . |
| 4,811,229 | 3/1989 | Wilson . |
| 4,812,035 | 3/1989 | Freedman et al. ................... 356/5 |
| 4,815,840 | 3/1989 | Benayad-Cherif et al. . |
| 4,817,000 | 3/1989 | Eberhardt . |
| 4,818,100 | 4/1989 | Breen . |
| 4,818,887 | 4/1989 | Weishaupt et al. . |
| 4,846,297 | 7/1989 | Field et al. . |
| 4,849,644 | 7/1989 | Mira et al. . |
| 4,855,915 | 8/1989 | Dallaire . |
| 4,861,159 | 8/1989 | Breen ...................................... 356/5 |
| 4,876,444 | 10/1989 | Field . |
| 4,877,311 | 10/1989 | Shernoff . |
| 4,878,754 | 11/1989 | Homma et al. . |
| 4,895,440 | 1/1990 | Cain et al. . |
| 4,902,126 | 2/1990 | Koechner ............................... 356/5 |
| 4,903,054 | 2/1990 | Wible . |
| 4,916,324 | 4/1990 | Meier . |
| 4,918,607 | 4/1990 | Wible . |
| 4,940,925 | 7/1990 | Wand et al. . |
| 4,947,094 | 8/1990 | Dyer et al. . |
| 4,950,075 | 8/1990 | Ichinose et al. ....................... 356/5 |
| 4,999,483 | 3/1991 | Okamoto . |

OTHER PUBLICATIONS

Systems, Measurement, and Control, vol. 100, Mar. 1978, pp. 1–8.

"On The Steering Of Automated Vehicles: Theory and Experiment", by R. E. Fenton, G. C. Melocik, and K. W. Olson, IEEE Transactions on Automatic Control, vol. AC-21, No. 3, Jun. 1976, pp. 306–315.

"On The Optimal Design Of An Automotive Lateral Controller", by R. E. Fenton and I. Selim, IEEE Transactions on Vehicular Technology, vol. 37, No. 2, May 1988, pp. 108–113.

"A Preview Steering Autopilot Control Algorithm For Passenger Vehicles", by Allan Y. Lee, General Motors Research Publication GMR-6501, Nov. 1988.

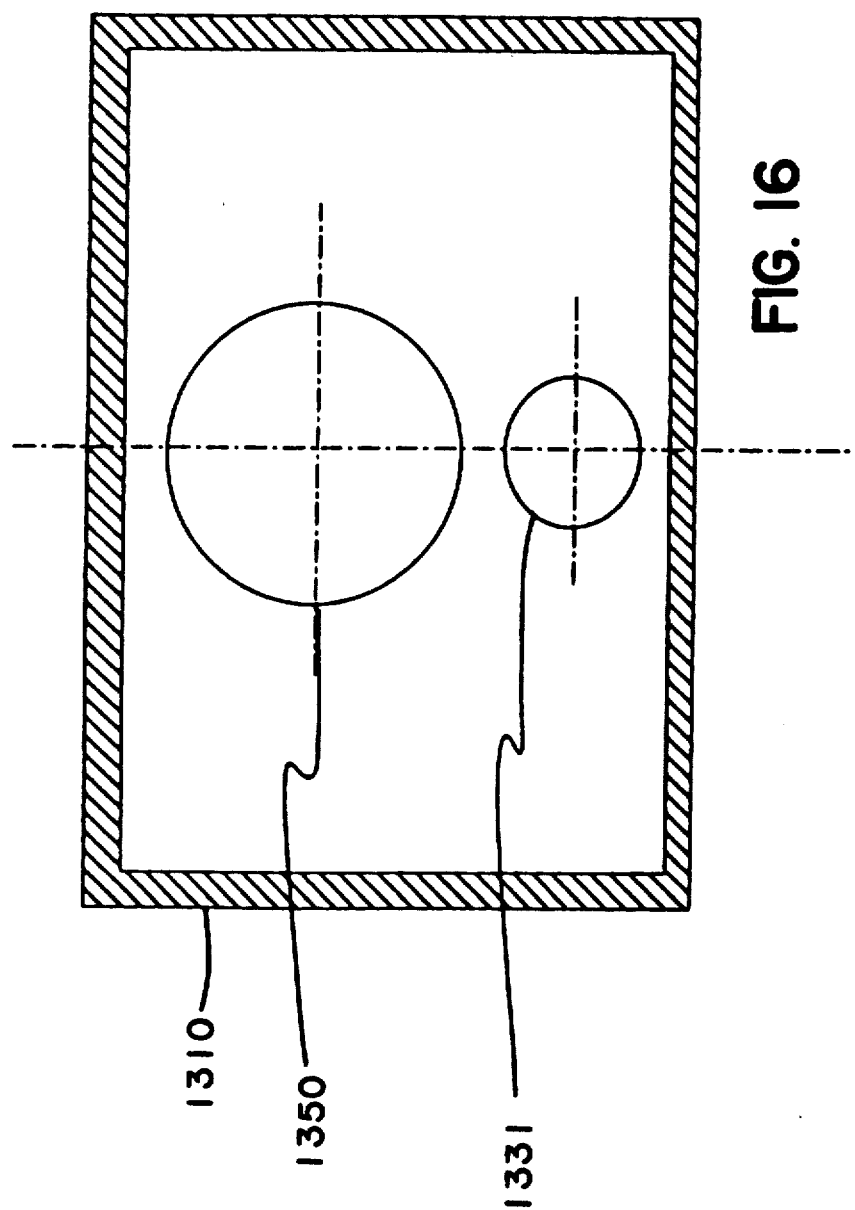

LASER RADAR FOR A VEHICLE LATERAL GUIDANCE SYSTEM

CROSS REFERENCE TO RELATED APPLICATIONS

The subject matter of the present application is related to copending applications, Ser. Nos. 07/592,295 and 07/592,232, filed concurrently herewith.

BACKGROUND OF THE INVENTION

1. Field of Invention

This invention relates to a laser radar apparatus for use in a vehicle lateral guidance system. Such vehicle lateral guidance systems may be used, for example, in a steering controller for use in an automobile on an automated highway. Such automated highways are contemplated for providing automated control of speed, steering and braking of an automobile, replacing the human driver as the prime source of control inputs in an automobile in order to improve traffic flow and highway safety. In addition, the present invention may also be applied to a vehicle lateral guidance control system which may be used in conjunction with a manually controlled automobile to provide supplementary control signals relating to course correction in order to maintain proper lane tracking of the vehicle on a superhighway, counteracting effects due to crosswinds, uneven road surfaces, inattentive driver, etc.

The present invention may also be applied to vehicles other than automobiles such as robotic material handling transfer systems, automated sweepers, automated office mail delivery systems and the like. In addition the laser radar apparatus of the present invention has applications in vehicle navigational systems and surveying equipment.

2. Description of the Prior Art

Prior art vehicle guidance systems are well known for controlling robotic material handling systems (i.e., automated guided vehicles or AGVs) and to some extent, automobiles. These control systems typically utilize an inductive sensor mounted near the bottom of a vehicle to sense current passing through a thin wire mounted on or underneath a road surface. The inductive sensor senses the magnetic field produced by the wire and outputs a signal indicating how far the vehicle has drifted from the desired course. A control system converts these signals into control signals which are used to bring the vehicle back on course.

These inductive type systems have met with some success in industrial robotics applications, however, they have a few serious drawbacks. The inductive sensor is prone to picking up spurious signals generated by other electromagnetic sources such as electric motors, powerlines, etc. Further, the magnetic field produced by the roadway mounted cable can be "shielded" by metallic structures such as bridges, concrete reinforcement rods (so-called "rebar"), etc. In addition, such a system requires the installation and maintenance of a cable at or near the surface of the roadway. The installation of such a cable for any extended length of roadway would be prohibitively expensive. Further, maintenance of such a cable would require the installation of transformers, current regulators and power supplies at periodic intervals along the roadway. Finally, such a system is especially vulnerable to maintenance problems, such as a break in a cable (at an expansion joint, for example). Such a break could disable an entire section of roadway, which, if unexpected, could produce disastrous results.

In addition to the practical disadvantages of the inductive sensor type systems, there are also design limitations of such systems which severely limit their use. The inductive sensor is mounted on the vehicle and senses only that section of roadway immediately underneath the vehicle. As such, the minimum radius of any road curvature, or conversely the maximum speed of the vehicle is limited to a range within which the inductive sensor can respond. The inductive sensor type systems cannot, in effect, "look ahead" as a human driver does, evaluate the roadway ahead and act accordingly. Inductive sensor systems can only react to the information received from the roadway immediately beneath the vehicle.

In an attempt to overcome the disadvantages of these inductive sensor type systems, several devices have been proposed which use some type of optical sensor to detect a reflector, stripe, or some other sort of optical indicia applied at or near the road surface. An example of one such system is that of U.S. Pat. No. 4,703,240 issued Oct. 27, 1987 to Yoshimoto et al. Yoshimoto discloses an industrial vehicle with a light beam illuminating the area immediately beneath a vehicle. A series of photocells detect the reflected beam from a stripe applied to the road or floor surface. Deviation from the desired path is detected by these photocells, and correction signals are used to correct the vehicle course. This apparatus overcomes the disadvantages of the inductive type sensors in that the photocells are relatively immune to electromagnetic interference. In addition, a current carrying wire need not be placed at or near the surface of the roadway, but rather a easily maintained painted or applied stripe or series of markers is applied to the surface of or adjacent to the roadway. The Yoshimoto apparatus does share one disadvantage of the inductive devices in that the device only scans the section of roadway immediately beneath the vehicle. While such a system may be suitable for slow moving industrial vehicles where response time is not a problem, in an automotive environment, such a system has been found to be unsatisfactory, as high vehicle speeds necessitate that the steering controller be able to anticipate changes in the direction of vehicle travel, rather than merely respond to them.

One apparatus which attempts to overcome such difficulties is shown in U.S. Pat. No. 4,049,961 to Marcy. Marcy shows an automatic guidance system for an automobile wherein lasers are used to scan a limited region ahead of the automobile. Return signals produced by light reflected from roadway or roadside mounted retroreflectors are used to indicate the position of the vehicle relative to the roadway. Although the Marcy device is equipped to "look ahead" down the roadway, the output of the apparatus merely indicates the deviation of the vehicle position from an imaginary centerline of the roadway. This technique allows for some anticipation in directions in travel direction, however, the Marcy device cannot determine or calculate road curvature based upon the received reflected signals and thus anticipate and respond to changing road geometry.

SUMMARY OF THE INVENTION

The present invention overcomes the disadvantages of the prior art by providing a laser radar apparatus for a vehicle which is capable of "looking ahead" of the vehicle in order to anticipate changes in roadway geometry. The present invention is made compact, inexpensive and more reliable by using only one laser source and one receiver to accurately measure the distance and angle between the vehicle and a retroreflector mounted at or near the road surface.

It is therefore an object of the present invention to provide a laser radar system capable of accurately measuring the distance and angle between a vehicle and a retroreflector located ahead at or near the road surface at some distance ahead of the vehicle.

It is a further object of the present invention to provide an inexpensive, compact laser radar apparatus with few moving parts in order to insure high reliability.

It is yet a further object of the present invention to provide accurate measurement of the distance and angle between a vehicle and a retroreflector located ahead at or near the road surface at some distance ahead of the vehicle with only one laser beam and one receiver.

It is yet an even further object of the present invention to provide distance and angle measurements between a vehicle and a retroreflector in order to improve reaction time of an automated steering control system.

BRIEF DESCRIPTION OF THE DRAWINGS

FIG. 16 shows a front view of the apparatus of FIGS. 13 and 14.

DETAILED DESCRIPTION

Figure 1:
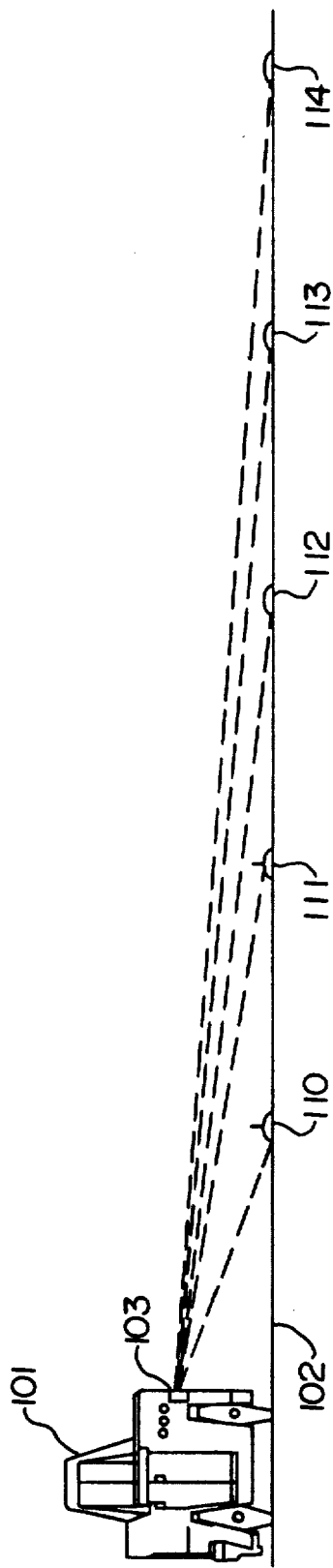
FIG. 1 is a side view depicting the relationship between a vehicle and retroreflectors mounted on a roadway.
Figure 2:
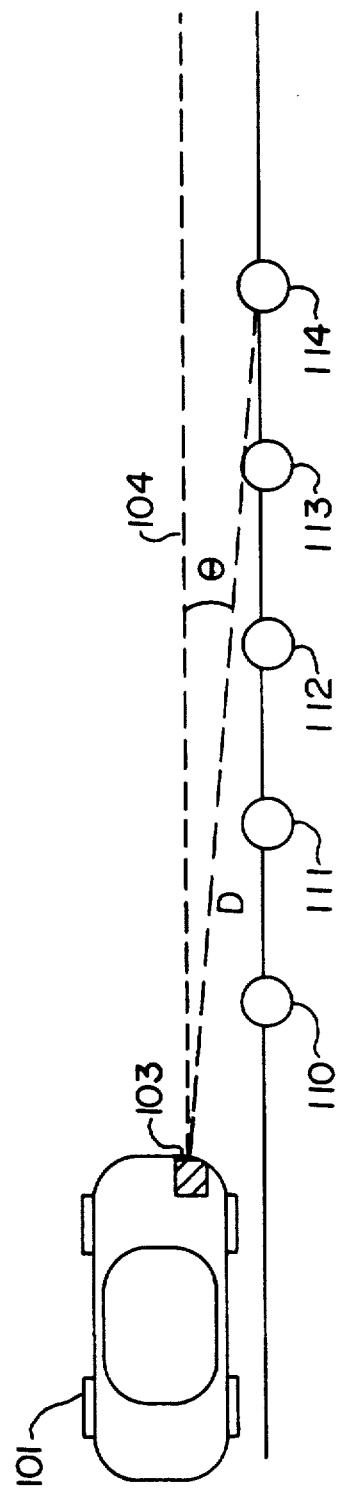
FIG. 2 is a top view depicting the relationship between a vehicle and retroreflectors mounted on a roadway.

Referring now to FIGS. 1 and 2, vehicle 101 is shown travelling along roadway 102 provided with retroreflectors 110, 111, 112, 113 and 114 along the length of at least one lane of roadway 102. Retroreflectors 110–114 may be standard roadway retroreflectors which are mounted at regular intervals, typically 44 feet apart. Laser radar apparatus 103 of the present invention may be mounted on the right front portion of the vehicle, for example, for use in a country (such as the U.S.) where vehicles typically travel on the right hand side of the road in order to scan roadway reflectors mounted on the right hand side of each line of the roadway. Alternatively, laser radar apparatus 103 may be mounted in the front left portion of the vehicle in order to scan the left hand side of roadway 102. It is also envisioned that laser radar apparatus 103 may be mounted in the center front portion of the vehicle to scan both sides of the roadway, either simultaneously or alternately. In addition, it is envisioned that two or more such laser radar devices may be mounted on the front portion of the vehicle in order to scan different portions of the roadway (i.e., left, right or center):

Laser radar apparatus 103, as will be discussed in more detail below, transmits a beam of light to at least one of retroreflectors 111, 112, 113 or 114 and receives a reflected signal from at least one of these retroreflectors. Referring to FIG. 2, the reflected signal laser radar apparatus 103 calculates the distance D between vehicle 101 to the retroreflector and the angle θ formed between axis 104 and an imaginary line drawn between vehicle 101 and a retroreflector, for example retroreflector 114. Axis 104 is an imaginary line formed parallel to the centerline axis of vehicle 101 and passing through the center of laser radar apparatus 103. As discussed above, Laser radar apparatus 103 may be mounted in any location on the vehicle where the apparatus can be provided with a view of at least one retroreflector ahead of the vehicle, however, in a preferred embodiment, it has been discovered that an optimum mounting height of two feet from the ground is desirable.

Figure 3:
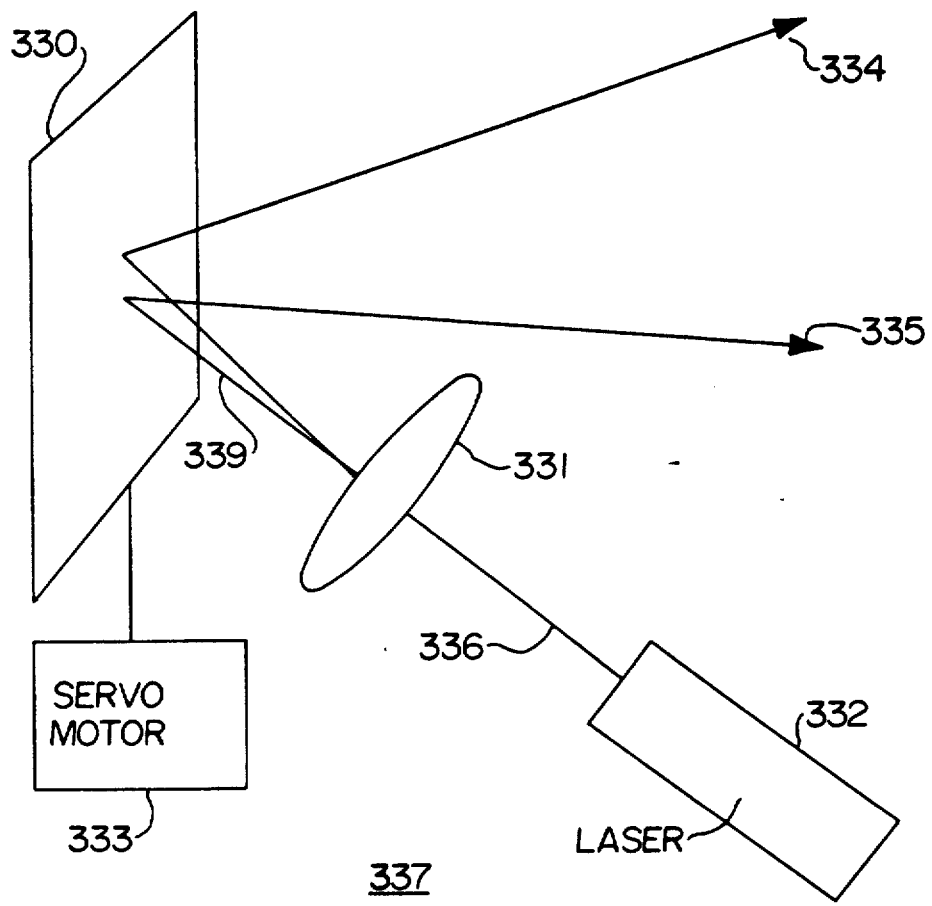
FIG. 3 shows a first embodiment of the laser transmitter of the laser radar apparatus of present invention.

FIG. 3 shows one embodiment of the laser transmitter portion 337 of a first embodiment of laser radar apparatus 103. Laser transmitter 337 comprises laser 332 which typically may be a medium power infrared laser of about 100 Watts peak power operating on a wavelength of 820–830 nm. Other wavelengths may also be used, such as 904 nm. One such commercially available laser is the LD-168 laser diode, manufactured by Laser Diode, Inc. of New Brunswick, N.J. The LD-168 laser diode operates at 904 nm and outputs 120 Watts.

The laser diode has the advantages that is relatively inexpensive, readily obtainable, compact and rugged. However, it is envisioned that other types of lasers, or indeed other types of light sources may be used. For example a conventional medium or high power gas laser may be used, or alternatively, a non-laser light source can also be applied. Wavelengths other that those set forth above may be used including the visible light or ultraviolet spectrum.

Light beam 336 produced by laser 332 passes through cylindrical lens 331 to produce fan beam 339. Fan beam 339 is essentially a beam of light which is very thin but broadens at a predetermined angle forming a triangular or fan shaped beam (hence the term "fan beam"). Fan beam 339 is reflected from mirror surface 330 and is directed towards roadway 102 shown in FIG. 1. The edges of fan beam 339 after being bounced off mirror surface 330 are represented in FIG. 3 by lines 334 and 335. Mirror surface 330 is controlled by servo motor 333 to cause fan beam 339 to scan a particular area, as will be discussed next in connection with FIG. 4. Servo motor 333 oscillates through a particular range of motion at a particular frequency to produce a regular scanning motion of fan beam 339. Mirror surface 330 and servo motor 333 are shown by way of example only. Other types of beam scanning devices known in the art may also be used, such as a polygonal mirror rotating at a fixed rate.

Figure 4:
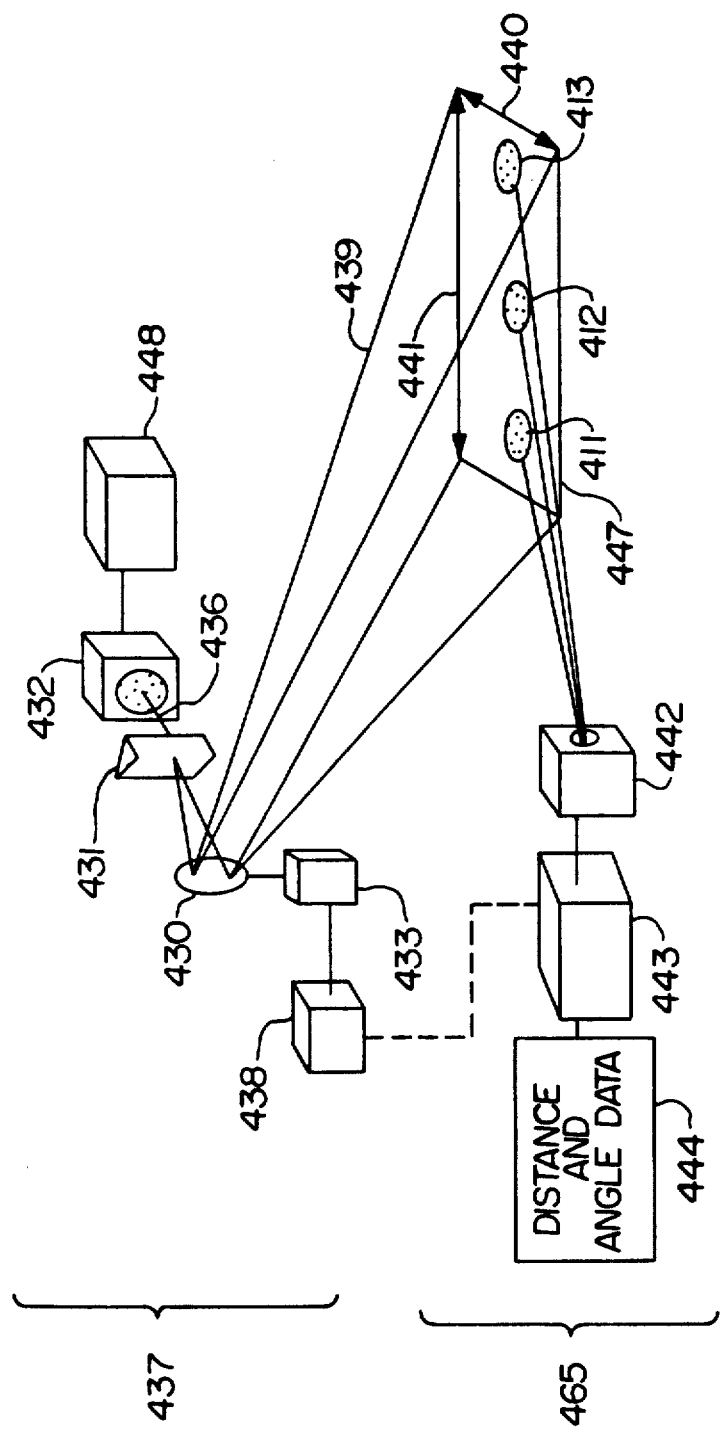
FIG. 4 is a further illustration of the apparatus shown in FIG. 3 also depicting the receiver apparatus.

FIG. 4 shows a first embodiment of laser radar apparatus 103 incorporating a version of laser transmitter 337 of FIG. 3. Laser transmitter 437 of FIG. 4 incorporates laser power supply 448, laser diode 432, cylindrical lens 431, mirror surface 430, servo motor 433 and servo motor controller 438. The operation of laser transmitter 437 is similar to laser transmitter 337 shown in FIG. 3. Power supply 448 provides power to laser diode 432 which outputs collimated light beam 436. Collimated light beam 436, which, as will be discussed below, is preferably carrier wave modulated, passes through cylindrical lens 431 to produce fan beam 439. Fan beam 439 is then reflected from mirror surface 430 and directed towards retroreflectors 411, 412 and 413 mounted at or near roadway 102 of FIGS. 1 and 2. Mirror surface 430 is oscillated through a predetermined arc by servo motor 433 which in turn is controlled by servo controller 438 to cause fan beam 439 to scan scanned area 447.

Scanned area 447 should incorporate at least one retroreflector or at least three retroreflectors, depending on the control algorithm used to control the vehicle. As set forth in more detail in Co-pending application Ser. No. 07/592,295, filed concurrently herewith, there are two control algorithms envisioned for used in the control system set forth in that application. In a first control algorithm, a minimum of three retroreflectors are scanned by laser radar apparatus 103, which outputs data representing the distance D and angle $\theta$ for each reflector. This data may then sent to a control processor to calculate road curvature. Road curvature is defined as the change in direction followed by roadway 102 to the right or left as vehicle 101 travels down roadway 102. Road curvature data is then transmitted to the steering control to activate course correction to the left or to the right for the vehicle as required. In a second embodiment of the control system, a single retroreflector is scanned and the distance D and angle $\theta$ data for that retroreflector is transmitted to the control. The control then compares the distance D and angle $\theta$ data with the previously received data to calculate road curvature. Either control algorithm may work in conjunction with laser radar apparatus 103 of the present invention.

The size of scanned area 447 could be altered on a dynamic basis, for example, as a function of vehicle speed or weather conditions. However, in the preferred embodiment the size of scanned area 447 would remain constant regardless of vehicle speed. Such an arrangement greatly simplifies the construction and operation of the laser radar. In such a system, all reflectors which fall within a predetermined beam path will be scanned and a separate output of distance D and angle $\theta$ will be produced for each reflected signal received. If only reflectors located a certain distance or range from vehicle 103 are of interest, the controller may then subsequently sort such data and use only data of interest to the particular control algorithm.

Figure 1A:
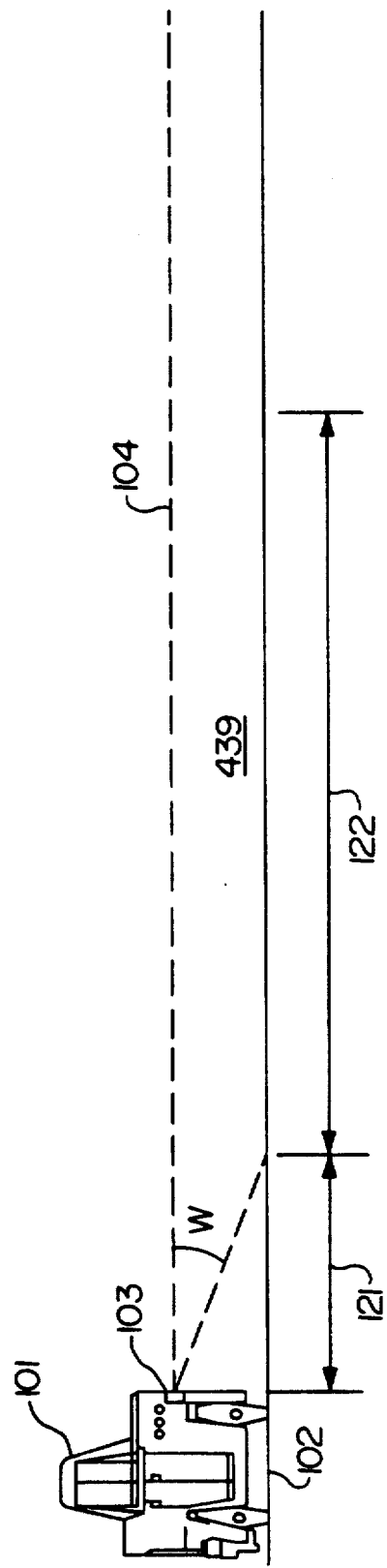
FIG. 1A is a side view depicting the relationship between a vehicle the scanning beam of the present invention.
Figure 2A:
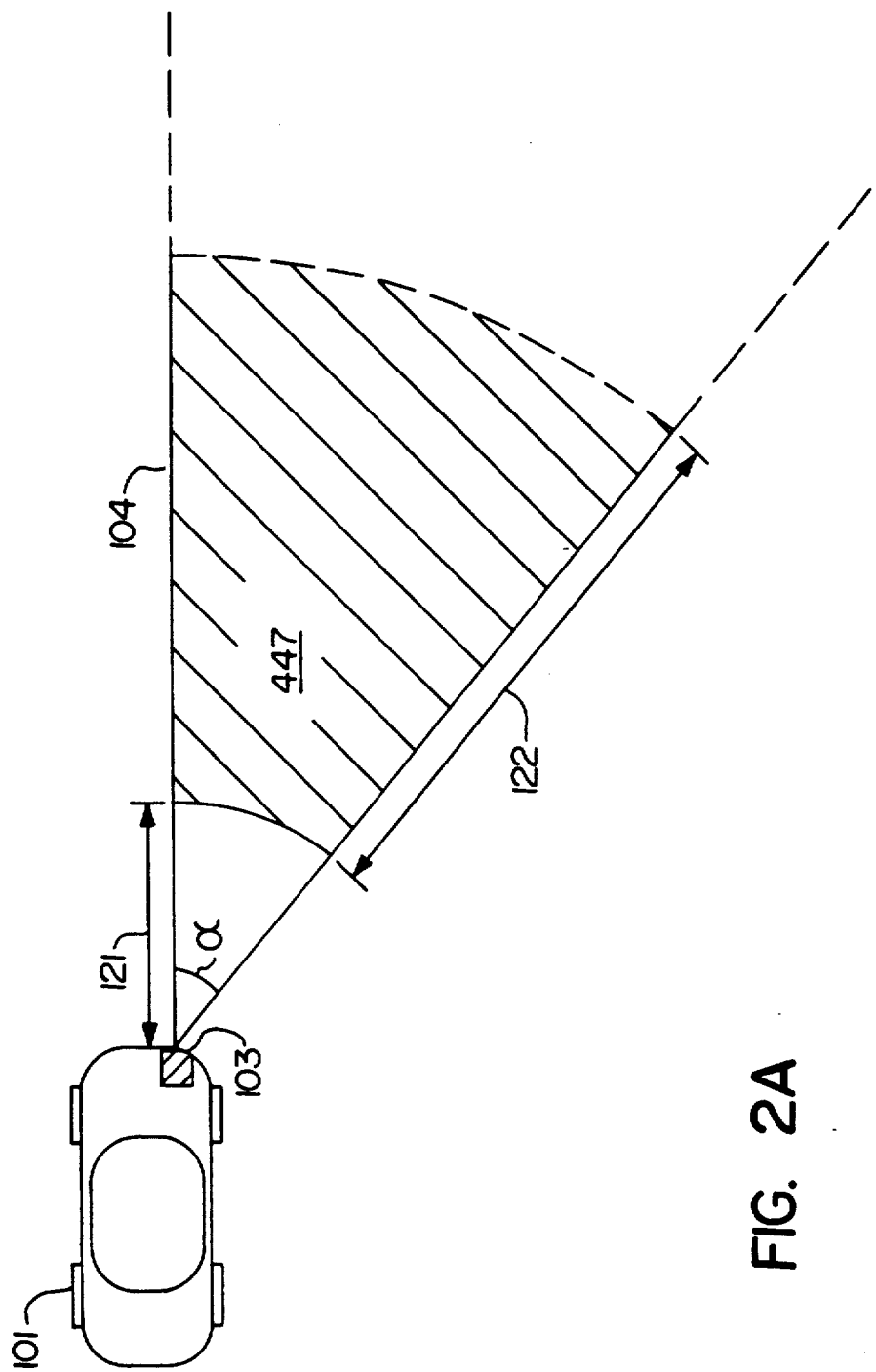
FIG. 2A is a top view depicting the relationship between a vehicle the scanning beam of the present invention.

FIGS. 1A and 2A more clearly describe the scanned area of the preferred embodiment. In FIG. 4, scanned area 447 is represented by width 440 and length 441 which would typically be approximately 20 feet and 130 feet respectively. The extent of the area scanned, however, relies at least in part on the effective transmission range of laser diode 332, 432 or 532. FIG. 1A shows a side view of vehicle 101 on roadway 102 and illustrates the aiming of fan beam 339, 439 or 539 of FIGS. 3, 4 or 5 respectively which, for the sake of clarity is shown here as fan beam 439. Fan beam 439 would typically be aimed in a forward direction along axis 104 with a beam angle $\omega$ of approximately 4.5 degrees. Such a beam angle would produce a beam that would scan the area from distance 121 in front of vehicle 101 (approximately 25 feet at the preferred two foot mounting height) to infinity. However, due to the attenuation effects of the atmosphere on fan beam 104, the effective range of fan beam 104 would be approximately distance 122 shown in FIG. 1A, approximately 130 feet.

Figure 5:
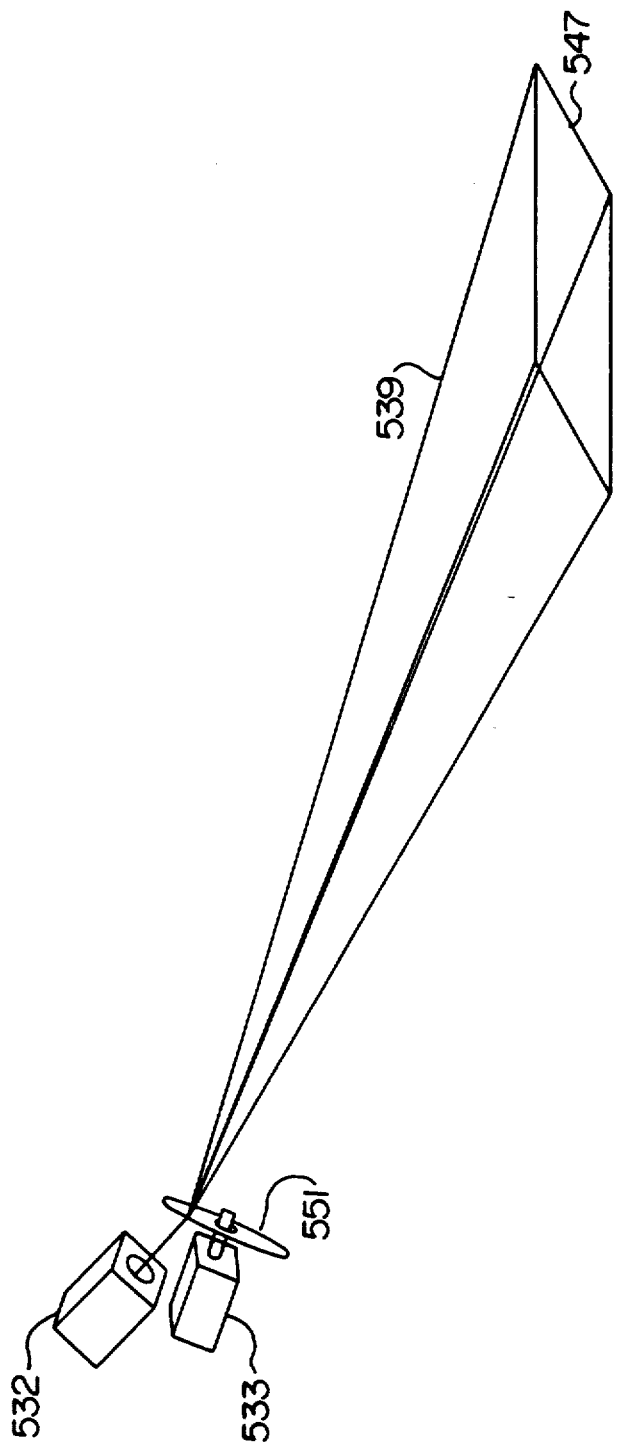
FIG. 5 shows an alternate embodiment of the laser transmitter of FIG. 4.

FIG. 2A is a top view of FIG. 1A showing the relationship between scanning angle $\alpha$ and scanned area 447 or 547 of FIGS. 4 and 5 respectively, which, for the sake of clarity is shown here as scanned area 447. Fan beam 339, 439 or 530 of FIGS. 4, 5, or 6 would be scanned through an angle $\alpha$ which would typically be approximately 10 degrees to the right of axis 104. Again, as in FIG. 1A, the beam would extend indefinitely, however, the effective transmission range would be distance 122 (approximately 130 feet) due to attenuation effects produced by the atmosphere. Scanned area 447 is shown as the shaded area in FIG. 2A extending from a radius 121 (typically 25 feet) which represents the contact point of fan beam with the ground in front of vehicle 101. As can be seen in FIG. 2A, the actual shape of scanned area 447 would of course be somewhat trapezoidal do to the point source nature of the fan beam.

FIG. 4 shows three retroreflectors 411, 412, and 413 falling within this scanned area, although as explained earlier, scanning area 447 may encompass more or fewer retroreflectors. As discussed above, the retroreflectors may be standard roadway reflectors embedded in the roadway. Such roadway reflectors are in use in many areas in the country, and as such, the present invention may not require additional equipment to be installed in the roadway. Alternately, the retroreflectors could be especially designed for use with the present invention.

For example, retroreflectors which produce a frequency shift in reflected light may be used in order to distinguish the reflected light from the guidance retroreflectors from other retroreflectors, say, for example from a passing truck. Further, retroreflectors are known which incorporate a bar code or other type of coding technique such that the reflected signal imparts some information content in addition to distance D and angle θ. Such information could be used to distinguish retroreflectors on the left hand side of roadway 102 from those on the right hand side of roadway 102 or to signal laser radar apparatus 103 that an exit is approaching, a particular destination has been reached, a certain speed limit change is occurring, or other relevant roadway information. Alternately, retroreflectors may be used which only reflect a selected range of frequencies of light (i.e., 800-950 nm) in order to distinguish reflections from guidance retroreflectors from spurious light noise. Differently colored retroreflectors may be used to distinguish retroreflectors in one lane from retroreflectors in an adjacent lane. Further, it is envisioned that the retroreflectors need not be roadway mounted as shown in the Figures, but may be mounted at another location near the roadway. For example, Marcy, U.S. Pat. No. 4,049,961 issued Sep. 20, 1977 shows the use of roadside retroreflectors mounted on posts. Such retroreflectors, mounted on posts, guardrails, retaining walls, overhead light posts, etc. are less sensitive to environmental conditions which may interfere with light transmission such as dirt, rain, and, in particular, accumulated snow. In addition, other types of reflectors may be used besides retroreflectors. Reflective paints or tapes may be used, for instance, to reflect the transmitted beam of light.

The reflected light from retroreflectors 411, 412, and 413 is transmitted back to laser radar apparatus 103 and is received by receiving apparatus 465. Receiving apparatus 465 comprises optical receiver 442, and receiver electronics 443. Optical receiver 442 may comprise a photocell, phototransistor, photodiode, (e.g., PIN photodiode, avalanche photo diode, etc.), or an array of photodiodes. Optical receiver 442 receives the reflected light beams from retroreflectors 411, 412 and 413 and outputs a corresponding electrical signal to receiver electronics 443. Receiver electronics 443 produces output data 444 which may be in the form of distance D and angle θ for each retroreflector scanned. Distance data D may be computed by measuring a phase difference between transmitted and received carrier waves modulated on the light beam. Angle θ data may be measured by detecting the angle of the mirror surface 431 output by servo controller 438. When a reflected light beam is received by receiver 442, the angle of mirror surface 431 at that time will be a function of indicate angle θ. Alternatively, if optical receiver 442 consists of an array of photodiodes, angle θ can be determined from the position on the array in which the signal is received.

Receiver electronics 443 inputs the received signal from optical receiver 442, and, as discussed below, produces output data 444 comprising the distance D and angle θ between each marker and vehicle 101.

FIG. 5 shows an alternative embodiment of the laser transmitters 337 and 437 of FIGS. 3 and 4 respectively. In place of cylindrical lens 331 or 431 and movable mirror 330 or 430, holographic disc 551 is used to create fan beam 539. Holographic disc 551 contains a series of fine gratings, each at a slightly different angle. When rotated at a constant speed by motor 552, the disc generates a fan beam which scans scanned area 547.

Figure 6:
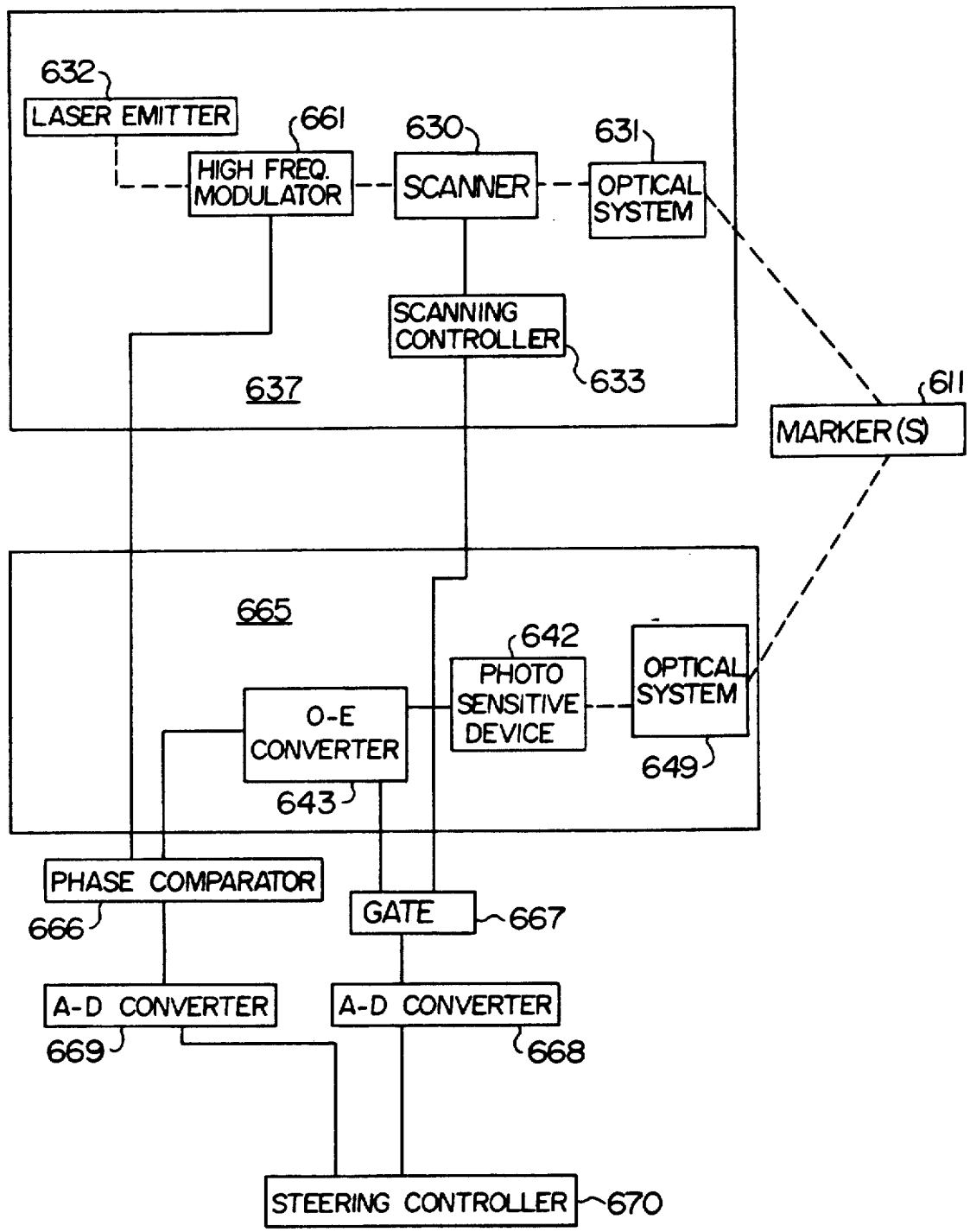
FIG. 6 is a block diagram of the laser radar apparatus according to a first embodiment of the present invention.

FIG. 6 shows a block diagram of a first embodiment of the present invention utilizing a carrier wave modulated on the transmitted beam as discussed in connection with FIGS. 3, 4 and 5. Laser Transmitter 637 comprises a laser emitter 632, which, as discussed above, may be a laser diode. Light (represented here as a dashed line) passes from laser emitter 632 through high frequency modulator 661. High frequency modulator 661 modulates a high frequency signal such as a 5 MHz signal onto the light beam. The modulated light beam then passes to scanner 630, such as mirror surface 330 shown in FIGS. 3 and 4 or holographic disc 551 shown in FIG. 5, which is in turn, controlled by scanning controller 633. The beam then passes through optical system 631 and is transmitted to road surface 102 containing retroreflective markers 611.

This drawing is highly schematic and the arrangement of the components shown sets forth only one possible embodiment. For example, optical system 631 is shown placed after scanner 630. One can envision that an embodiment such as that shown in FIGS. 3 and 4, optical system 631 would include a cylindrical lens located before scanner 630. In addition, optical system 631 may incorporate additional focusing elements such as lenses, to further define the beam. Similarly, high frequency modulator 661 may be provided after laser emitter 632 as shown in FIG. 6 to modulate the light beam produced by laser emitter 632. Alternatively, high frequency modulator 661 may be provided in the power supply of laser emitter 632 to provide a modulated signal to laser emitter 632 in order to produce a modulated light output.

Light reflected from markers 611 is transmitted to receiver 665 which comprises an optical system 649 for focusing the received light. The received light is then transmitted to photosensitive device 642. Optoelectric converter 643, coupled to photosensitive device 642 converts the received light to an electrical signal. This photosensitive device may comprise a single phototransistor or photodiode, however, as discussed above, a photocell or photodiode array may be used to detected received angle.

The output of optoelectric converter 643 is then passed to phase comparator 666 which in turn is also coupled to high frequency modulator 661 in transmitter laser 637. Phase comparator 666 outputs a signal to A-D converter 669 indicative of the phase difference between the transmitted and received waves. The distance D between the vehicle and a marker is a function of this phase difference and the output of A-D converter 669 containing this distance data is transmitted to steering controller 670.

Optoelectric converter 643 also produces an output to operate gate 667 when light is received from one or more markers 611. Gate 667 is also coupled to an output of scanning controller 633 in laser transmitter 637 which outputs scanning angle data. When gated by the received light signal, this scanning angle data indicates the angle θ of the light beam relative to the axis of the vehicle. A-D converter 668 converts this data to digital form and transmits the angle θ to steering controller 670. From the distance D and angle θ data, the steering controller 670 can construct a mathematical model of the road curvature and correct vehicle course accordingly. This calculation scheme is not pertinent to the present invention but is set forth in more detail in copending application Ser. No. 07/592,295, discussed supra and incorporated herein by reference.

Figure 7:
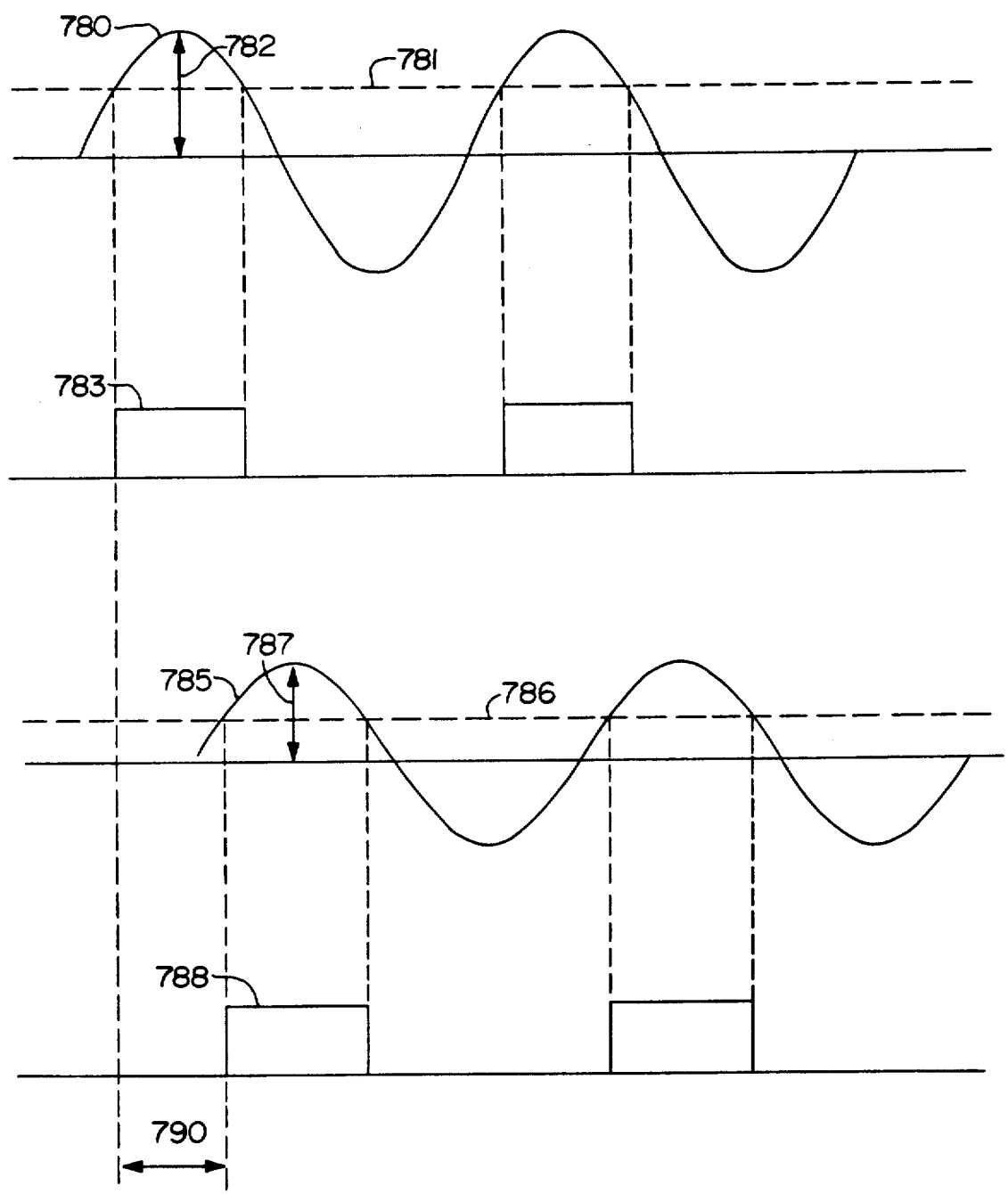
FIG. 7 is a waveform diagram showing the relationship between transmitted and received waveforms in a first embodiment of the present invention.

FIG. 7 shows a waveform diagram showing transmitted and received carrier wave signals for a first embodiment of the present invention shown in FIG. 6. Waveform 780 represents the carrier wave modulated on fan beam 439 of FIGS. 3, 4 or 5. Carrier wave 780 may be a sinusoidal type waveform with a frequency in the range of 1-10 MHz, typically 5 MHz. The particular frequency chosen for the carrier wave will, of course, limit the maximum measurable distance for laser radar apparatus 103. In other words, if the phase shift produced by a returning signal is more than 360 degrees, the resultant measured distance will be ambiguous. The maximum distance that can be measured by the system for a given frequency can be calculated by the following equation:

$$D_a = c/(2 \times F_m)$$

where Da is the maximum distance (in meters), c is the speed of light ($3.0 \times 10^8$ meters/second) and $F_m$ is the carrier wave frequency. For the range listed above, a carrier wave of 10 MHz would have a maximum measurable distance of 15 meters while a 1 MHz carrier would have a maximum measurable distance of 150 meters. Of course, the maximum measurable distance is more directly affected by the transmissibility of the fan beam through the atmosphere as discussed above.

Threshold level 781 represents a predetermined threshold value which is determined as a fraction of the peak value 782 of carrier wave 780. Here, the threshold value is shown as being equal to approximately one-half of peak value 782. In the phase comparator 666 of FIG. 6, this threshold value is used to produce gated pulse 783. Waveform 785 represents the carrier wave modulated on the received beam reflected back to laser radar apparatus 103 from any one of retroreflectors 110, 111, 112, 113, or 114. Threshold level 786 represents a similar threshold value to threshold level 781 with the exception that threshold level 786 is determined as a predetermined fraction of the peak value 787 of received carrier wave 785. Phase comparator 666 of FIG. 6 uses this threshold value to produce gated pulse 788. The fractional values used for threshold level 782 and threshold level 786 are preferably equal fractions (i.e., they have the same value such as ½, ⅓, ¼, etc.). The threshold levels are used in order to measure the phase difference between transmitted carrier wave 780 and received carrier wave 785. If the zero crossing point of the waveforms was used to determine phase difference, inaccuracies arising due to noise, D.C. offset, etc. would tend to produce inaccurate results. As will be apparent from the discussion below, the time differences measured between transmitted and received waveforms are very small, and hence any small error in measurement will produce large variations in calculated results.

Phase comparator 666 will subsequently measure the time delay $T_d$ between the leading edges of gated pulses 783 and 788. Distance between laser radar apparatus 103 and a retroreflector 110, 111, 112, 113 or 114 can then be measured using the formula:

$$D = \tfrac{1}{2}(c \times T_d)$$

Where c equals the speed of light (in meters per second), $T_d$ equals the time delay in seconds, and D equals the distance in meters.

As one can readily appreciate, the speed of light is very great, and thus the phase difference between transmitted carrier wave 780 and received carrier wave 785 will be very small. For example, for discussion purposes, the speed of light can be rounded off to approximately 1 foot per nanosecond. In FIG. 1, if retroreflector 110 is positioned 50 feet ahead of vehicle 101 then the total transmission time for a light beam to reach retroreflector 110 and return to laser radar apparatus 103 would be 100 nanoseconds (i.e., 50×2). In order to accurately detect such minute time differences and provide for their accurate measurement, phase comparator 666 would necessarily have to have a counter or other such device with a resolution at least tenfold higher that the smallest distance to be measured. To provide for accurate measurement of the propagation delay of light, a counter on the order of at least one GigaHertz would have to be used. Such counters are presently available as gallium arsenide (GaAs) semiconductor integrated circuit devices. One such commercially available device is the GigaBit Logic model 10G061 1.3 GHz counter, manufactured by GigaBit Logic of Newbury Park, Calif.

Figure 8:
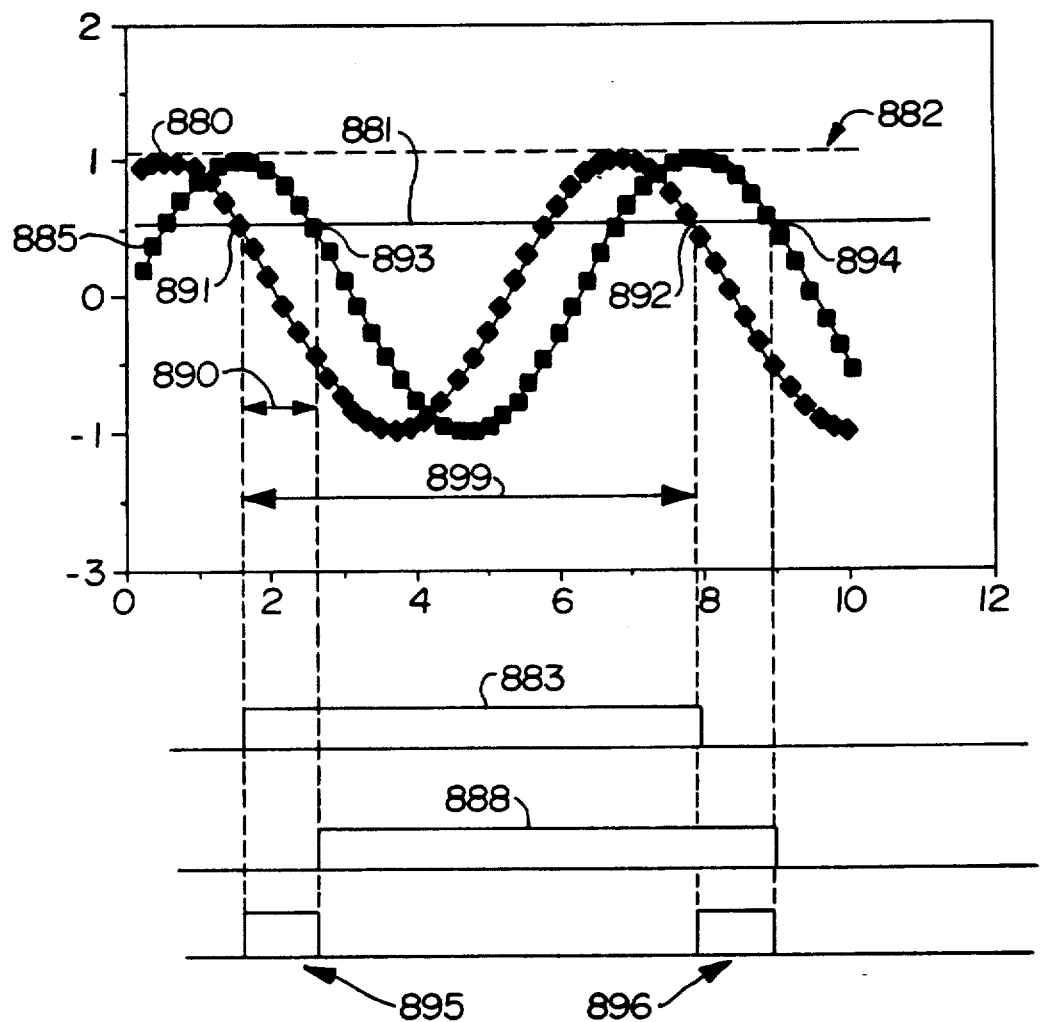
FIG. 8 is another waveform diagram showing the relationship between transmitted and received waveforms in a first embodiment of the present invention.

FIG. 8 shows a slightly different phase difference measuring scheme than the one shown in FIG. 7. Here, transmitted carrier wave is shown as waveform 880. Received carrier wave 885 is shown as having the same amplitude as transmitted carrier wave 880 for clarity. In reality, as is shown in FIG. 7, received carrier wave 885 would tend to have a reduced amplitude due to transmission losses through the ambient air, losses incurred in the retroreflector and other associated losses in the optical equipment. It may be desirable to use an AGC circuit to amplify received carrier wave 885 to the same amplitude as transmitted carrier wave 880 in order to more accurately measure phase difference. As shown in FIG. 8, the phase difference 890 is measured as a difference between the crossing points of transmitted and received carrier waves 880 and 885 and a predetermined threshold level 881, here shown as approximately one half of peak amplitude 882. The crossing points 891 and 892 of transmitted carrier wave 880 are used to produce gated pulse 883. Similarly, crossing points 893 and 894 of received carrier wave 885 are used to produce gated pulse 888. The time difference between these pulses is measured by phase comparator 666 by counting the number of pulses 895 or 896 produced by a GigaHertz counter between the leading or trailing edges of the two gated pulses 883 and 888. As in FIG. 7, distance D is determined as being equal to one-half of the time delay multiplied by the speed of light.

It is envisioned that in the fan beam embodiment of FIGS. 3, 4 and 5, distance D measurements and angle $\theta$ measurement would be produced for each complete scan of fan beam 439 or 549 over scanned area 447 or 547, respectively. As the velocity of light is very large, the angle of mirror surface 330 or 430 or the position of holographic disc 551 at the time received carrier wave 785 or 785 is received by laser radar apparatus 103 would be representative of angle $\theta$ data for a particular retroreflector.

Figure 9:
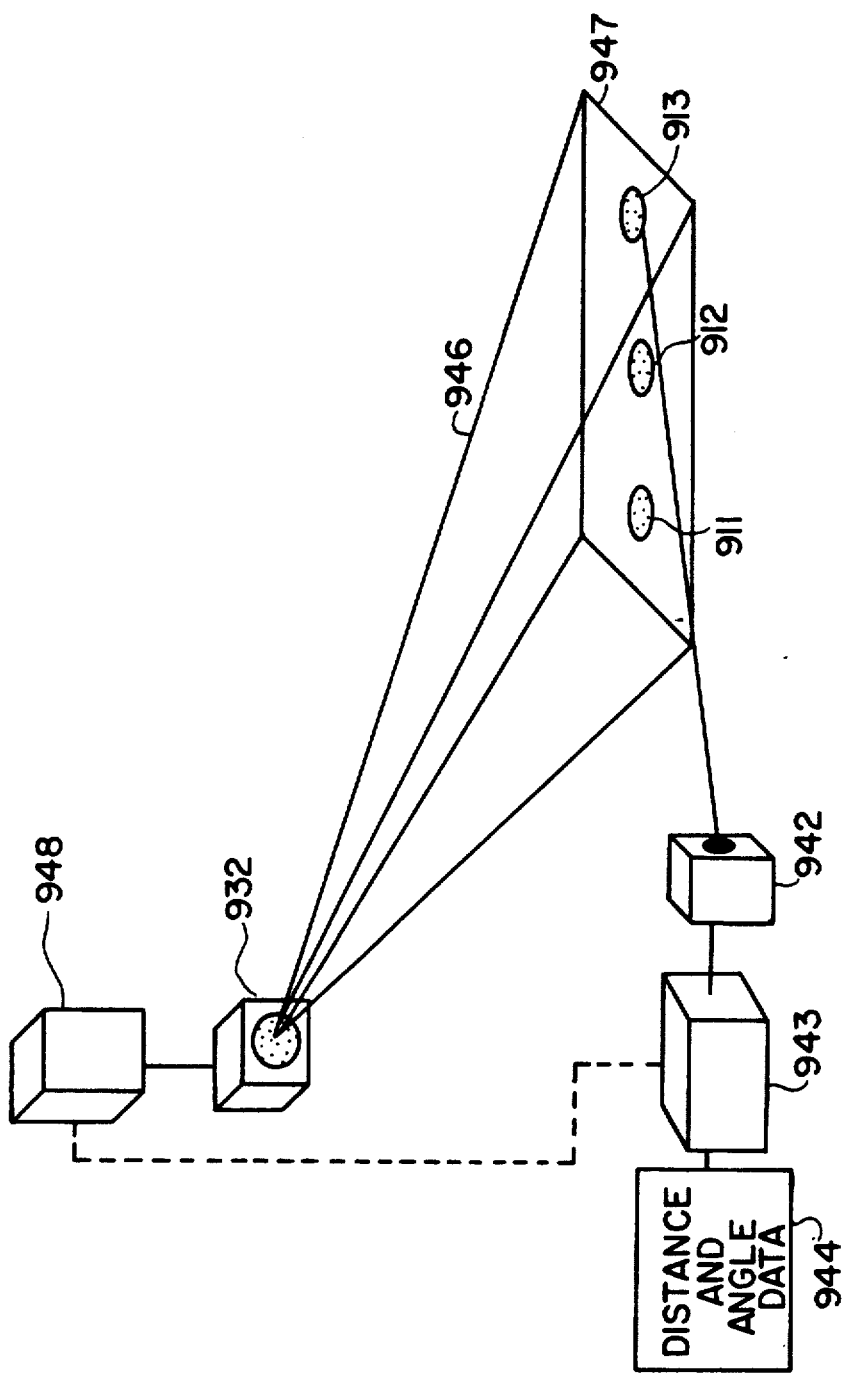
FIG. 9 shows a preferred floodlight beam embodiment of the present invention.

FIG. 9 shows a preferred embodiment of the laser radar apparatus of the present invention. In FIG. 9, instead of a scanning fan beam 539 as shown in FIG. 5, laser diode 932 outputs floodlight beam 946 covering all of predetermined area 947. Predetermined area 947 would in the preferred embodiment be similar in size and shape to scanned area 447 discussed supra in connection with FIGS. 1A and 2A. Floodlight beam 946 is preferably pulse modulated. Optical receiver 942 receives light pulses reflected back from retroreflectors 911, 912 and 913. The time delay between the transmitted and received pulses is compared to calculate the distance D between vehicle 101 and each retroreflector 911, 912 and 913. Since floodlight beam 946 is not scanned by mirror surface 430 as shown in FIG. 4, the angle θ data must be produced by using a photodiode array for optical receiver 942. The position of the received light pulse on the photodiode array will determine the angle θ.

The use of floodlight beam 946 has many advantages, chief among them simplicity, compactness and durability. Prior art laser scanning devices using rotating polygonal mirrors or other moving components are well known. Although such devices may be suitable for surveying, bar code scanning or laboratory work, their high cost and necessary precision between moving parts are undesirable in the automotive environment. The floodlight type laser transmitter is compact, relatively inexpensive (compared to moving beam systems) and easy to maintain, as there are no moving parts.

Figure 10:
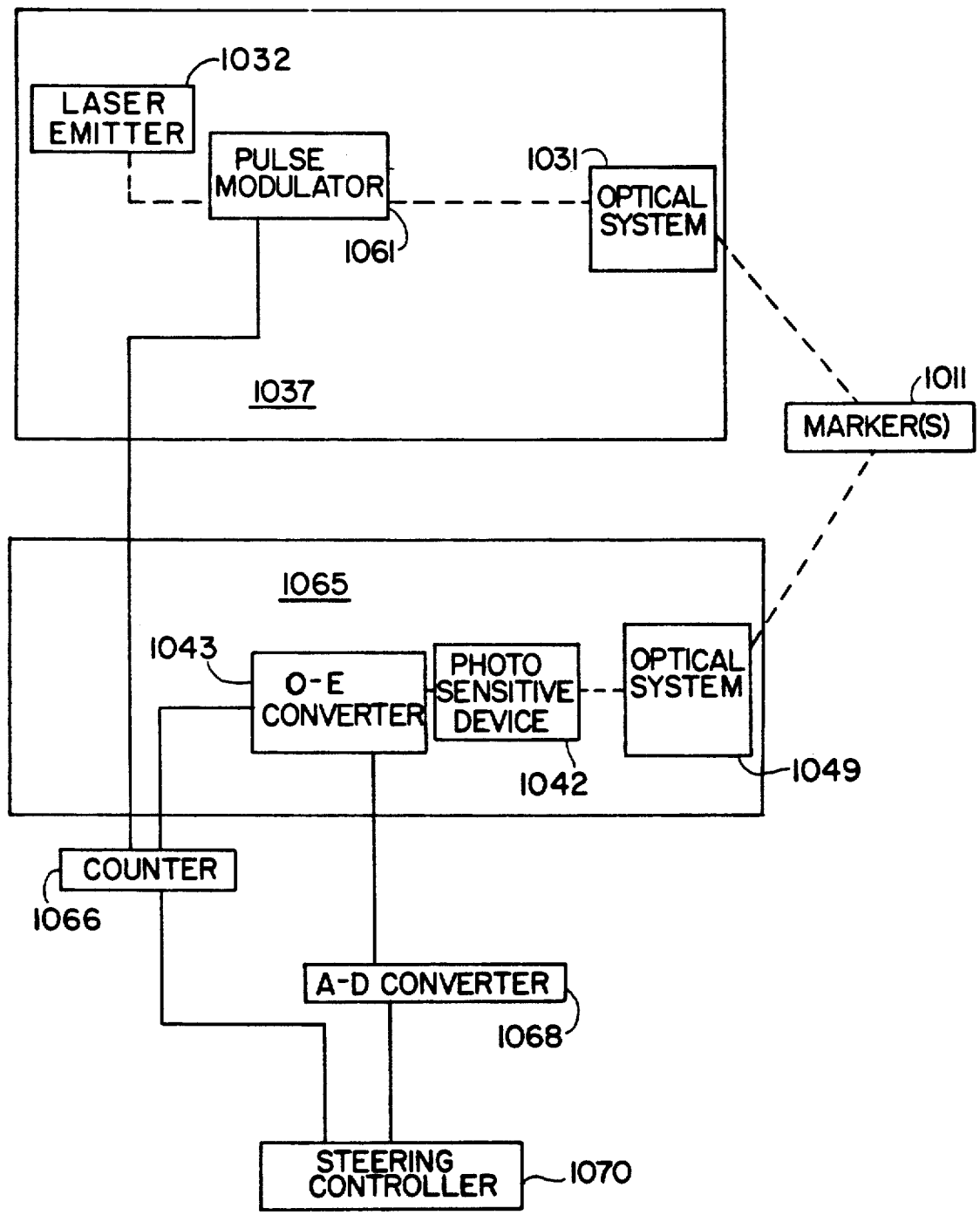
FIG. 10 is a block diagram of a preferred embodiment of the present invention.

FIG. 10 shows a block diagram of a preferred embodiment of the present invention as shown in FIG. 9 utilizing a pulse modulated transmitted beam. Laser Transmitter 1037 comprises a laser emitter 1032, which, as discussed above, may be a laser diode. Light (represented here as a dashed line) passes from laser emitter 1032 through pulse modulator 1061. Pulse modulator 1061 modulates the light beam with a pulse such as a 10 to 20 nanosecond pulse with a 10 to 20 nanosecond rise time. The pulse modulated light beam then passes to optical system 1031, which further focuses the floodlight beam and transmits the beam to roadway 102 containing retroreflective markers 1011.

In a preferred embodiment, the floodlight beam of FIG. 9 would preferably be used in conjunction with the pulse modulation technique of FIG. 10. It is envisioned, however, the floodlight beam could be modulated with a carrier wave and the fan beam embodiment of FIGS. 3, 4 and 5 could conceivably could be pulse modulated.

By pulsing the floodlight for 10 to 20 nanoseconds, however, average power required for the floodlight beam is greatly reduced compared to a carrier wave modulated floodlight or fan beam. By reducing power consumption, a smaller powered laser may be used in a given application thus decreasing both size and cost of laser transmitter 1037. Further, by reducing overall average power consumption, a more powerful pulsed beam may be used, increasing range and resolution. It is also worth noting that with the pulse type system eye safety is enhanced as the laser uses a lower overall average power.

A further advantage of using the pulse modulation technique with the floodlight beam is that the received pulses are easily distinguishable from one another as they will be separated in time. On the other hand, if the floodlight beam were modulated with a carrier wave, it would be difficult to distinguish the received signals from one another, as the received carrier waves would tend to interfere constructively and destructively with one another.

Light reflected from markers 1011 is transmitted to receiver 1065 which comprises optical system 1049 for focusing the received light. The received light is then transmitted to photosensitive device 1042. Optoelectric converter 1043, coupled to photosensitive device 1042 converts the received light to an electrical signal. Photosensitive device may comprise a photodiode array to detect received angle θ.

The output of optoelectric converter 1043 is then passed to counter 1066 which in turn is also coupled to pulse modulator 1061 in transmitter laser 1037. Counter 1066 outputs a signal indicative of the time delay between the transmitted and received pulses. The distance D between the vehicle and a marker is a function of this time delay and the output of counter 1066 containing this distance data is transmitted to steering controller 1070. Steering controller 1070 is preferably a programmed controlled microprocessor known in the art including permanent, program and addressable temporary storage memory.

Optoelectric converter 1043 also produces an output to A-D converter 1068 indicative of where on the photodiode array the light pulse was received from one or more markers 1011. The position of the received light pulse on the photodiode array is a function of the angle θ of the light beam relative to the axis of the vehicle. A-D converter 1068 converts this data to digital form and transmits the angle θ to steering controller 1070. From the distance D and angle θ data, the steering controller 1070 can construct a mathematical model of the road curvature and correct vehicle course accordingly.

Figure 11:
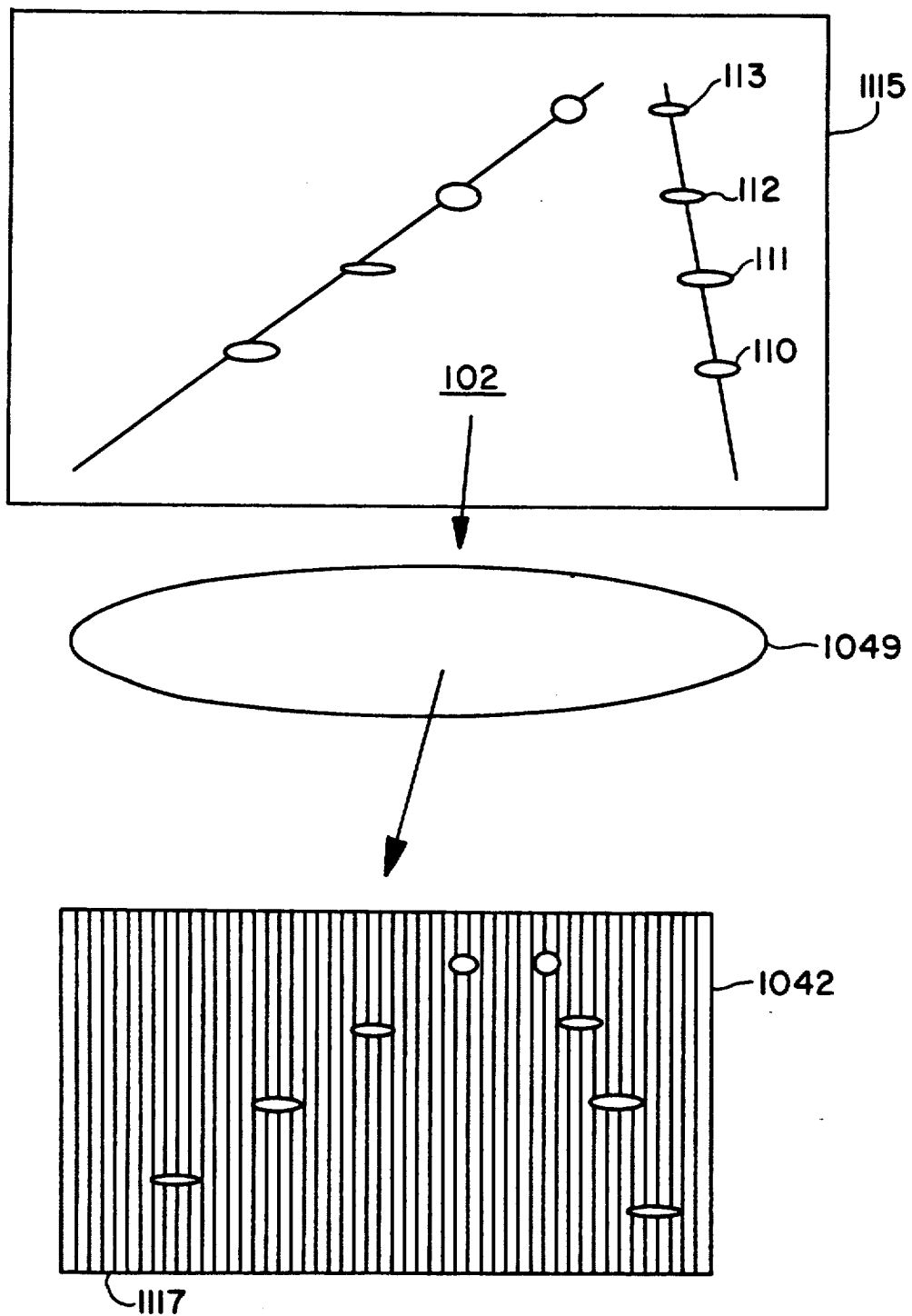
FIG. 11 shows how an image produced by light reflected from roadway mounted retroreflectors is translated into an image in the receiver array in the laser radar apparatus of the present invention.

FIG. 11 describes on more detail the operation of detector array 1042. Box 1115 depicts how roadway 102 in FIGS. 1 and 2 would "appear" to laser radar apparatus 103 or to a human driver. Box 1115 here shows retroreflectors mounted on both sides of roadway 102, however, as discussed above, it is envisioned that laser radar apparatus 103 may be designed to view only one side of the roadway 102. Retroreflectors 110, 111, 112 and 113 are shown along the right hand side of roadway 102. The "image" represented by box 1115, as reflected by light from laser radar apparatus 103 is then processed through optical system 1049 to produce an "image" on detector array 1042. Detector array 1042 may comprise, for example, 40 narrow strip-like photosensitive elements 1117. Light striking any one of these elements, anywhere along the strip, will produce an output signal. The position of a detected signal on the array will be indicative of the angle θ at which the retroreflector lies in relation to vehicle axis 104 of FIG. 1.

Figure 12:
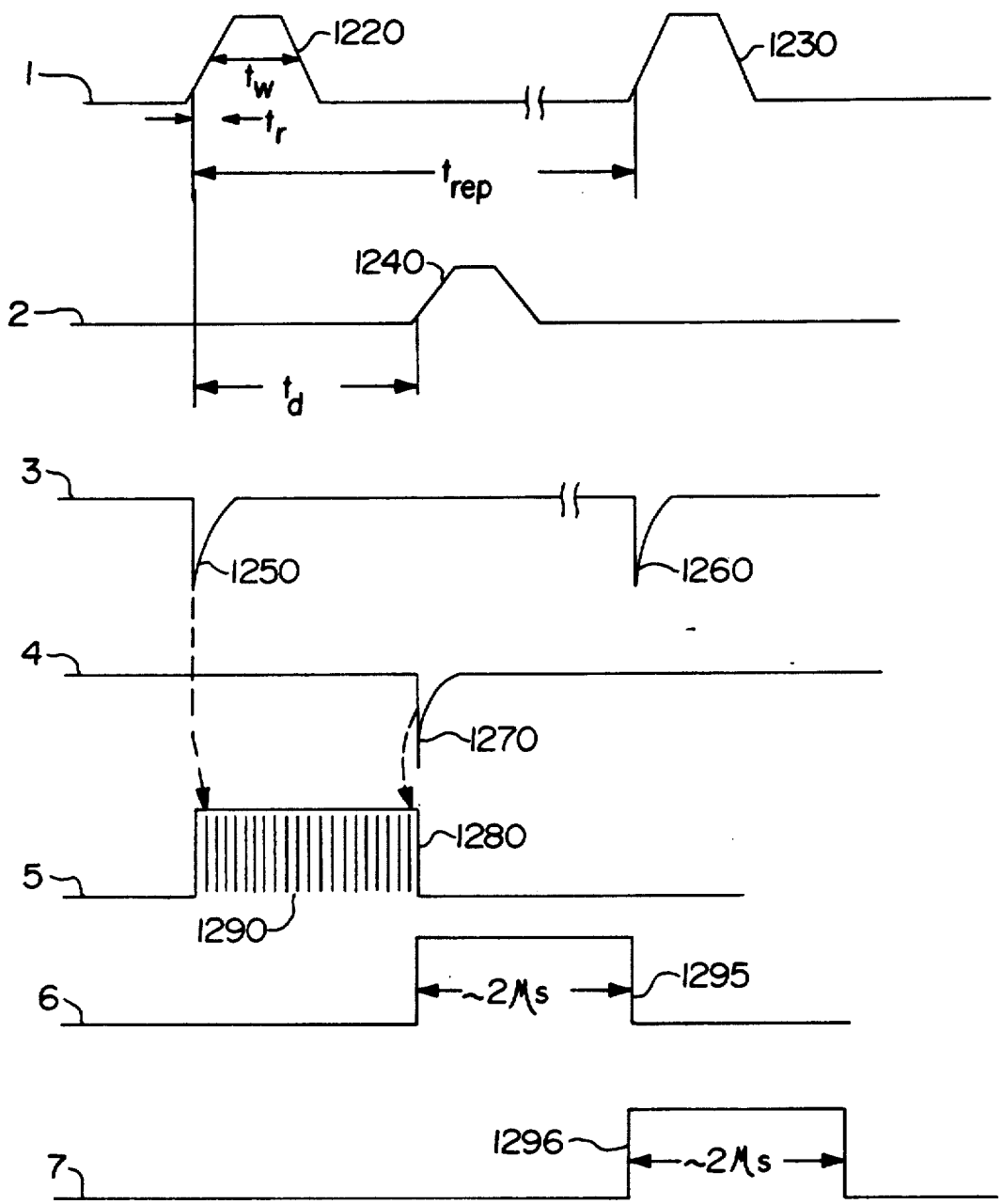
FIG. 12 is a waveform diagram showing the relationship between transmitted and received waveforms in a preferred embodiment of the present invention.

FIG. 12 shows a waveform diagram for a preferred embodiment of the present invention, the pulse modulation technique. Waveform 1 represents the pulse modulation of the transmitted beam, which in a preferred embodiment would be floodlight beam 946. Although the pulse is generally square, it does have a slightly trapezoidal shape, here shown slightly exaggerated. The width $t_w$ of pulse 1220 at a point equal to one half of its peak value would be approximately 10 to 20 nanoseconds while the time $t_{rep}$ between pulses 1220 and 1230 would be on the order of 10 microseconds. Pulses 1220 and 1230 are shown here as occurring at regular periodic intervals, however, it is envisioned that the time interval $t_{rep}$ need not be uniform but instead may be irregular or adjusted as a function of, say, vehicle speed. Similarly, the amplitude of pulses 1220 and 1230 may be altered to extend the range of laser radar apparatus 103 or counteract environmental conditions (e.g., fog, rain, sleet, etc.) Rise time $t_r$ is the time equal for pulse 1220 to go from 10% to 90% of its peak value and is indicative of the slope of the sides of pulse 1220. Generally pulse width $t_w$ would be approximately 1.4 times the rise time $t_r$. Rise time would thus be in the range of 10 to 30 nanoseconds. Waveform 2 represents the pulse modulation of the received beam reflected back from one of retroreflectors 911, 912 or 913. Received pulse 1240 is shifted in time by an amount equal to $t_d$, as measured from the 10% level of each waveform. As in the carrier wave embodiment, greater accuracy can be obtained by measuring the distance between waveforms at some predetermined threshold value, here 10% of peak value. Counter 1066 of FIG. 10 receives start pulses 1250 and 1260 shown in waveform 3 from pulse modulator 1061. Counter 1066 uses these start pulses 1250 and 1260 in conjunction with stop pulse 1270 shown in waveform 4 produced by optoelectric converter 1043 to produce gated pulse 1280 shown in waveform 5. Counter 1066 contains an 8-bit GaAs 1 GHz (or higher) counter which produced pulses 1290 gated by gated pulse 1280. Counter 1066 the produces read data pulse 1295 shown in waveform 6 to read the count from the GaAs counter and store data pulse 1296 shown in waveform 7 is produced by counter 1066 to store the count into a cache memory of controller 1070.

As discussed above, in a preferred embodiment, the pulse modulation technique would be used in conjunction with the floodlight beam 946 of FIG. 9 and angle data would be produced by measuring the position of a received pulse on photodiode array 1042 as discussed in connection with FIG. 11. When scanning a plurality of retroreflective markers, a series of reflected pulses will be produced for each transmitted pulse. It is envisioned that distance D and angler $\theta$ data will be output for each reflected pulse received after a transmitted pulse. Thus, as shown in FIG. 12, with transmitted pulses spaced 10 microseconds apart, the floodlight embodiment of FIG. 9 would scan scanned area 947 at a rate of 100 KHz. That is to say, new marker distance D and angle $\theta$ data would be produced for each reflected signal received every 10 microseconds.

As can be appreciated, the change in distance D and angle $\theta$ data over time can be measured to calculate data other than vehicle position, for example, vehicle speed or acceleration.

Figure 13:
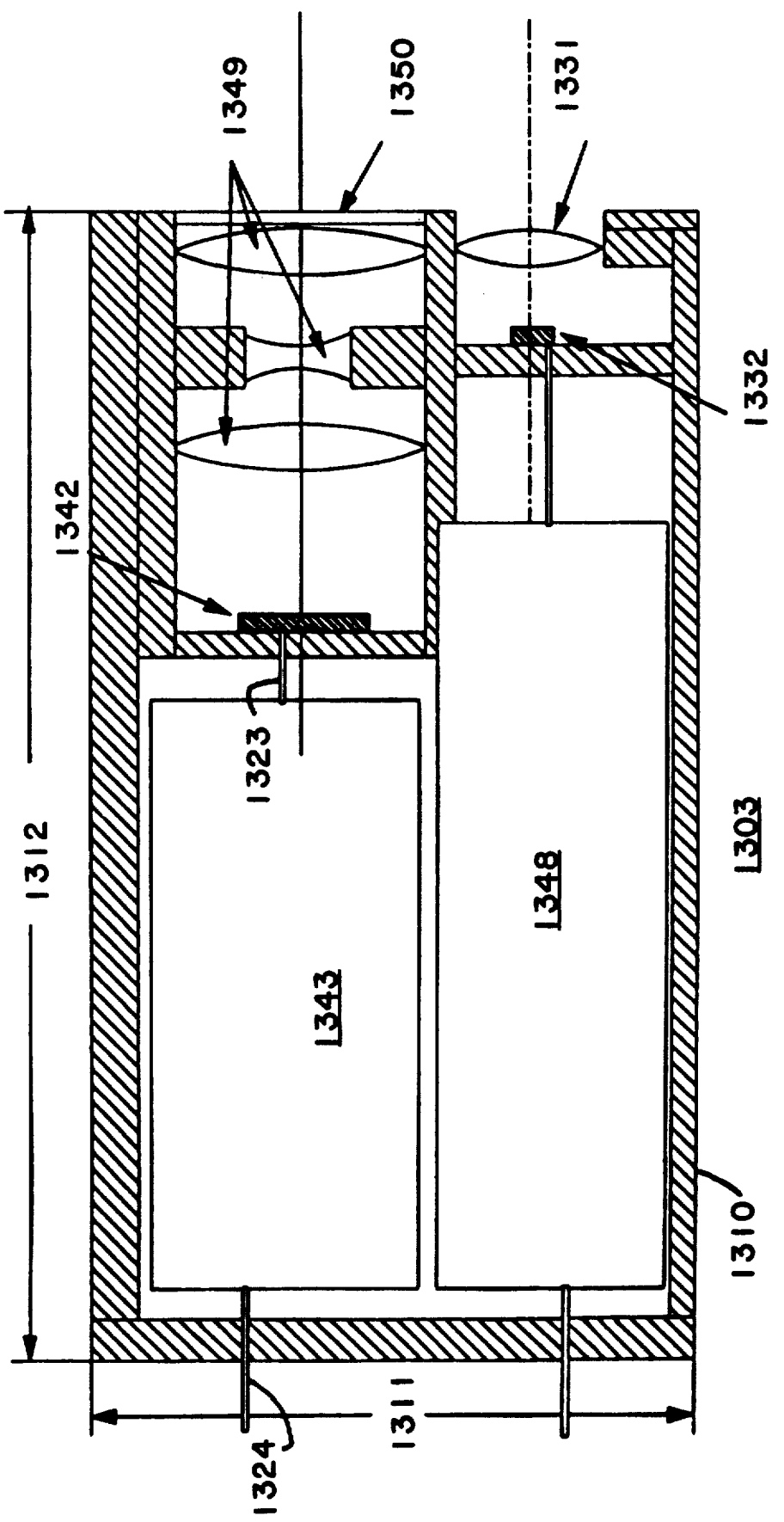
FIG. 13 shows a side view of the apparatus of a preferred embodiment of the present invention.

FIG. 13 shows a cutaway side view of a preferred embodiment of the present invention, the floodlight pulse modulated laser radar apparatus set forth in FIGS. 9, 10 and 12 supra. Laser radar apparatus 1303 comprises a housing 1310 which would be attached to the bumper of vehicle 101 at a height of about two feet. Housing 1310 contains laser drive circuitry 1348 which drives laser diode 1332. Laser diode 1332 may be an infrared type laser diode, as discussed above, rated for approximately 800 mW (RMS) with a peak power of approximately 100 Watts. Laser light produced by laser diode 1332 is transmitted through expanded beam lens 1331 which produces a floodlight beam of appropriate shape and size. Expanded beam lens 1331 is shown here is schematic form only, and the shape of the lens as shown in FIG. 13 may take other forms in order to produce the appropriately expanded beam.

Light beams reflected back from retroreflectors 110, 111, 112, 113 or 114 mounted at or near road surface 102 first pass through narrow band optical filter 1350. Narrow band optical filter 1350 filters out any spurious light signals such as sunlight and artificial light produced by automobiles, streetlights, etc. Only wavelengths at or near the transmitted wavelength will pass through optical filter 1350. Imaging lenses 1349 focus the received light beams into an image form on detector array 1342. Again, the exact arrangement of lenses here is shown in schematic form only.

Detector array 1342, as discussed above, may be any type of suitable photodiode, phototransistor or other type of photosensitive array. Preferably a 40 element array would be used, which, for the scanned area dimensions discussed above would produce an angular measurement resolution of approximately 0.25 degrees. Of course, larger arrays can be used either to enhance resolution or measure a larger area. Conversely, a smaller array may be used if a lower resolution or smaller scanned area is acceptable. One commercially available photodiode array is the Centronic Linear Array LD35-0 manufactured by Centronic, Inc. of Newbury Park, Calif. This 35 element array has slightly fewer elements than a preferred embodiment, however it is at the present time readily available. It is envisioned that a custom linear array comprising more units may be used in place of this 35 element array. Alternatively, if a larger array size is desired, two or more smaller arrays may be grouped together with appropriate optics and electronics.

Detector array 1342 outputs a series of signals over parallel line 1323 to preamplifier and biasing circuitry 1343. Preamplifier and biasing circuitry 1343 amplifies the low voltage signals received from detector array 1343 and outputs a serial signal on output line 1324 to control circuitry such as a vehicle guidance control. The control circuitry compares the received pulses with the transmitted pulses as shown in FIG. 12 and outputs distant D and angle $\theta$ data.

The overall size of housing 1310 is represented by dimensions 1311 and 1312 which may be, for example 300 and 150 millimeters, respectively. As can be seen, the floodlight embodiment allows the use of a fairly compact laser radar apparatus.

Figure 14:
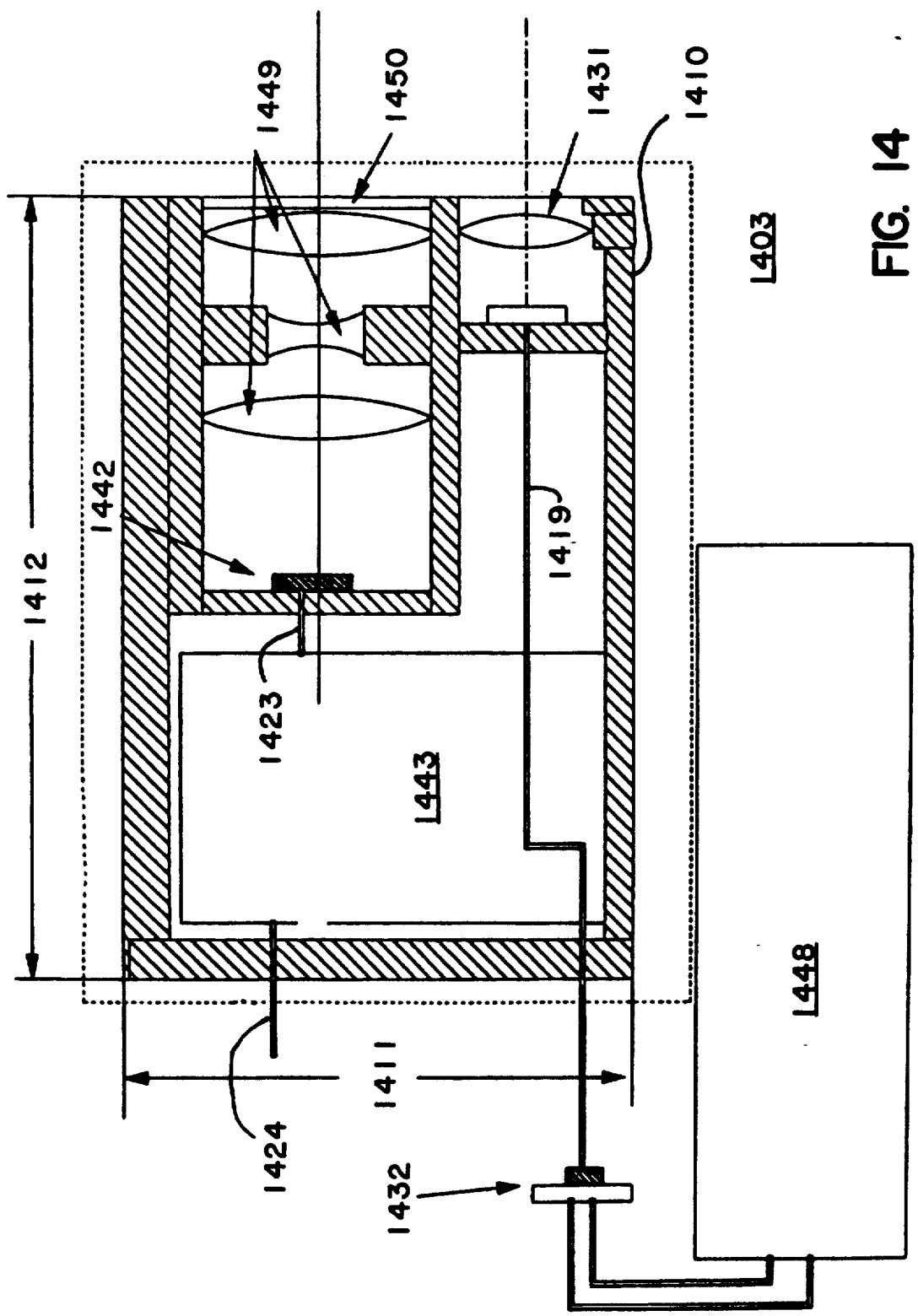
FIG. 14 shows a side view of an alternative implementation of a preferred embodiment of the present invention.

FIG. 14 shows an alternate version of a preferred embodiment of FIG. 13. In FIG. 14, laser drive circuitry 1448 and laser diode 1432 has been removed from housing 1410 and mounted elsewhere on the vehicle. Light from laser diode 1432 is transmitted to housing 1410 via fiber optic cable 1419. This design has two main advantages. First, by removing the bulky laser drive circuitry from housing 1410, the size of housing 1410 can be reduced. The overall size of housing 1410 is represented by dimensions 1411 and 1412 which may be, for example 200 and 150 millimeters, respectively, almost one third smaller than the apparatus of FIG. 13. In addition, by moving laser diode 1432 and laser drive circuitry 1448 to a location inside vehicle 101, the sensitive electronics are less exposed to the elements as they would be in housing 1410. Theoretically, it is possible to move preamplifier and biasing circuitry 1443 inside vehicle 101 to reduce packaging size even further, however, the parallel output 1423 from diode array 1442 would require a large ribbon cable which would in addition have to be extensively shielded, as the output of diode array is at a relatively low voltage.

Figure 15:
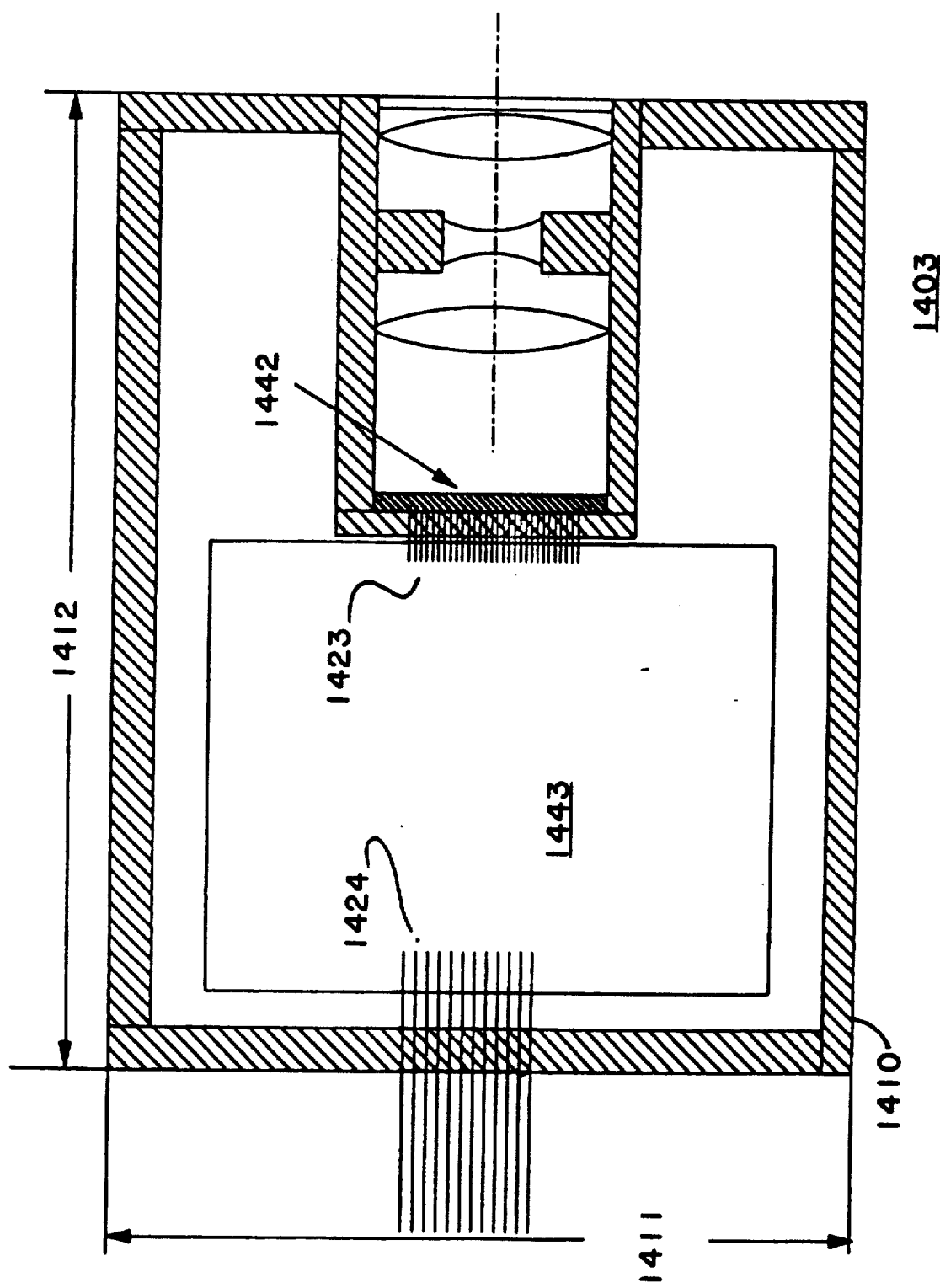
FIG. 15 shows a top view of the apparatus of FIG. 14.

FIG. 15 shows a top view of the embodiment shown in FIG. 14. In this view, parallel line 1423 can be seen more clearly. Parallel line 1423 comprises 40 wires, one for each element of the array plus power and ground leads. Output line 1424 typically would contain 8 or more leads and transmit data in a serial format.

FIG. 16 shows a front view of the laser radar apparatus of FIGS. 13 and 14. Expanded beam lens 1331 is shown mounted directly above narrow band optical filter 1350. This arrangement of the transmitter laser and receiver apparatus has been found through experimentation to be most efficient for receiving reflected pulses. Referring again to FIG. 1, light emitted from laser radar apparatus 103 will propagate in a generally forward direction. However, reflected beams from retroreflectors 110, 111, 112, 113 and 114 will reflect back to vehicle 101 at an angle upward from roadway 102.

Through experimentation, it has been determined that placement of the receiver apparatus, represented in FIG. 16 as narrow band optical filter 1350, directly above the transmitter laser results in the optimal reception of reflected light from road mounted retroreflectors 110, 111, 113, 113 and 114.

While the invention has been particularly shown and described with reference to the preferred embodiment thereof, it will be understood by those skilled in the art that various changes in form and details may be made therein without departing from the spirit and scope of the present invention.

We claim:

1. In a vehicle guidance system for guiding a vehicle traveling on a non-fixed path comprising an apparatus for continuously generating a beam of electromagnetic radiation for scanning a stationary reflecting surface and an apparatus for receiving reflected electromagnetic radiation from said stationary reflecting surface, a method for detecting the shape of the vehicle path by measuring distance and incident angle between the vehicle and the stationary reflecting surface comprising the steps of:
   continuously generating at said vehicle a beam of electromagnetic radiation of predetermined dimensions;
   modulating at least one pulse on said beam to produce a pulse modulated beam;
   transmitting said pulse modulated beam from said vehicle towards at least one stationary reflecting surface;
   receiving a reflected pulse modulated bean from said at least one stationary reflection surface;
   focusing said reflected pulse modulated beam onto a detector array;
   measuring the position of reflected pulse modulated beam on said detector array;
   measuring a propagation delay between said pulse modulated beam and said reflected pulse modulated beam;
   calculating the distance between said vehicle and said at least one stationary reflecting surface as a proportion of said measured propagation delay; and
   calculating the incident angle between said vehicle and said at least one stationary reflecting surface as a proportion of the position of said reflected pulse modulated beam on said detector array,
   wherein the shape of the vehicle path is detected from the distance and angle between said vehicle and said at least one stationary reflecting surface and said vehicle is guided to follow said detected path.

2. The method of claim 1 wherein said beam of electromagnetic radiation comprises a light beam.

3. The method of claim 2 wherein said light beam comprises a laser beam.

4. The method of claim 3 wherein said laser beam comprises an infrared laser beam.

5. The method of claim 4 wherein said infrared laser beam has a wavelength of 904 nanometers.

6. The method of claim 1 wherein said modulating step further comprises the step of modulating said beam with a pulse of 10 to 20 nanoseconds in width.

7. The method of claim 6 wherein said pulse has a rise time of between 10 to 30 nanoseconds.

8. The method of claim 1 wherein said beam of predetermined dimensions comprises a floodlight beam.

9. The method of claim 1 wherein said detector array is a photodiode array.

10. The method of claim 1 wherein said reflecting surface comprises a retroreflector.

11. The method of claim 1 wherein said measuring step further comprises the step of measuring the propagation delay between said pulse modulated beam and said reflected pulse modulated beam at a point equal to a predetermined fraction of the amplitude of each beam.

12. The method of claim 11 wherein said predetermined fraction is one tenth.

13. In a vehicle guidance system for a vehicle traveling on a non-fixed path comprising an apparatus for continuously generating a beam of electromagnetic radiation for scanning a stationary reflecting surface and an apparatus for receiving reflected electromagnetic radiation from said stationary reflecting surface, an apparatus for detecting the shape of the vehicle path by measuring distance and incident angle between a vehicle and a stationary reflecting surface comprising:
   vehicle mounted generating means for continuously generating a beam of electromagnetic radiation of predetermined dimensions;
   modulator means for modulating at least one pulse on said beam to produce a pulse modulated beam;
   transmission means for transmitting said pulse modulated beam toward at least one stationary reflecting surface;
   vehicle mounted receiving means for receiving a reflected pulse modulated beam from at least one stationary reflecting surface;
   focusing means for focusing said reflected pulse modulated beam onto a detector array;
   vehicle mounted detector means for measuring the position of reflected pulse modulated beam on said detector array and measuring a propagation delay between said pulse modulated bean and said reflected pulse modulated beam;
   first calculating means for calculating said distance between said vehicle and said at least one stationary reflecting surface as a proportion of said measured propagation delay; and
   second calculating means for calculating said incident angle between said vehicle and said at least one stationary reflecting surface as a proportion of the position of said reflected pulse modulated beam on said detector array,
   wherein the shape of the vehicle path is detected from the distance and angle between said vehicle and said at least one stationary reflecting surface and said vehicle is guided to follow said detected path.

14. The apparatus of claim 13 wherein said generating means generates a light beam.

15. The apparatus of claim 13 wherein said generating means generates a laser beam.

16. The apparatus of claim 13 wherein said generating means generates an infrared laser beam.

17. The apparatus of claim 16 wherein said infrared laser beam has a wavelength of 904 nanometers.

18. The apparatus of claim 13 wherein said pulse is 10 to 20 nanoseconds in width.

19. The apparatus of claim 18 wherein said pulse has a rise time of between 10 to 30 nanoseconds.

20. The apparatus of claim 13 wherein said beam of predetermined dimensions comprises a floodlight beam.

21. The apparatus of claim 13 wherein said detector array is a photodiode array.

22. The apparatus of claim 13 wherein said reflecting surface comprises a retroreflector.

23. The apparatus of claim 13 wherein said detecting means measures the propagation delay between said pulse modulated beam and said reflector pulse modulated beam at a point equal to a predetermined fraction of the amplitude of each beam.

24. The apparatus of claim 13 wherein said predetermined fraction is one tenth.

25. In a vehicle guidance system for guiding a vehicle traveling on a non-fixed path comprising an apparatus for continuously generating a beam of electromagnetic radiation for scanning a stationary reflecting surface and an apparatus for receiving reflected electromagnetic radiation from said stationary reflecting surface, a method for detecting the shape of the vehicle path by measuring distance and incident angle between the vehicle and the stationary reflecting surface comprising the steps of:
  continuously generating at said vehicle a fan shaped beam of electromagnetic radiation of predetermined dimensions;
  modulating said beam to produce a modulated fan shaped beam;
  scanning said modulated fan shaped beam through a predetermined arc towards at least one stationary reflecting surface;
  receiving a reflected modulated beam from said at least one stationary reflecting surface;
  measuring an angle of said fan beam within said predetermined arc;
  measuring a phase difference said modulated fan shaped beam and said reflected modulated beam; and
  calculating the distance between said vehicle and said at least one stationary reflecting surface as a proportion of said measured phase difference; and
  calculating the incident angle between said vehicle and said at least one stationary reflecting surface as a portion of said angle of said fan beam within said predetermined arc,
wherein the shape of the vehicle path is detected from the distance and angle between said vehicle and said at least one stationary reflecting surface and said vehicle is guided to follow said detected path.

26. The method of claim 25 wherein said beam of electromagnetic radiation comprises a light beam.

27. The method of claim 26 wherein said light beam comprises a laser beam.

28. The method of claim 27 wherein said laser beam comprises an infrared laser beam.

29. The method of claim 28 wherein said infrared laser beam has a wavelength of 904 nanometers.

30. The method of claim 25 wherein said modulating step further comprises the step of modulating said fan shaped beam with a sinusoidal carrier wave.

31. The method of claim 30 wherein said sinusoidal carrier wave has a frequency of between 1 and 10 megaHertz.

32. The method of claim 25 wherein said measuring step further comprises the step of measuring the phase difference between said modulated fan shaped beam and said reflected modulated beam at a point equal to a predetermined fraction of the amplitude of each beam.

33. The method of claim 25 wherein said stationary reflecting surface comprises a retroreflector.

34. In a vehicle guidance system for a vehicle traveling on a non-fixed path comprising an apparatus for continuously generating a beam of electromagnetic radiation for scanning a stationary reflecting surface and an apparatus for receiving reflected electromagnetic radiation from said stationary reflecting surface, an apparatus for detecting the shape of the vehicle path by measuring distance and incident angle between a vehicle and a stationary reflecting surface comprising:
  vehicle mounted generating means for continuously generating a fan shaped beam of electromagnetic radiation of predetermined dimension;
  modulator means for modulating said fan shaped beam to produce a modulated fan shaped beam;
  scanning means for scanning said modulated fan shaped beam through a predetermined arc towards at least one stationary reflecting surface;
  vehicle mounted means for receiving a reflected modulated beam from said at least one stationary reflecting surface;
  vehicle mounted detector means for measuring a phase difference between said modulated fan shaped beam and said reflected modulated beam; and
  vehicle mounted measuring means for measuring an angle of said fan beam within said predetermined arc,
  first calculating means for calculating said distance between said vehicle and said at least one stationary reflecting surface as a proportion of said measured phase difference; and
  second calculating means for calculating said incident angle between said vehicle and said at least one stationary reflecting surface as a proportion of said angle of said fan beam within said predetermined arc,
wherein the shape of the vehicle path is detected from the distance and angle between said vehicle and said sat least one stationary reflecting surface and said vehicle is guided to follow said detected path.

35. The apparatus of claim 34 wherein said generating means generates a light beam.

36. The apparatus of claim 34 wherein said generating means generates a laser beam.

37. The apparatus of claim 34 wherein said generating means generates an infrared laser beam.

38. The apparatus of claim 37 wherein said infrared laser beam has wavelength of 904 nanometers.

39. the apparatus of claim 34 wherein said carrier wave is a sinusoidal carrier wave.

40. The apparatus of claim 39 wherein said sinusoidal carrier wave has a frequency of between 1 and 10 megaHertz.

41. The apparatus of claim 34 wherein said detecting means measures the phase difference between said modulated fan shaped beam and said reflected modulated beam at a point equal to a predetermined fraction of the amplitude of each beam.

42. The apparatus of claim 34 wherein said scanning means comprises a movable mirror surface.

43. The apparatus of claim 34 wherein said scanning means further comprises a holographic disc.

44. The apparatus of claim 34 wherein said receiving means comprises a photodiode.

* * * * *

UNITED STATES PATENT AND TRADEMARK OFFICE
CERTIFICATE OF CORRECTION

PATENT NO. : 5,202,742
DATED : April 13, 1993
INVENTOR(S) : Andrew A. Frank and Masahiko Nakamura It is certified that error appears in the above-identified patent and that said Letters Patent is hereby corrected as shown below:

TITLE PAGE:

Please correct the spelling of the Assignee as follows:

Change "Saiki" to --Seiki--

Signed and Sealed this

Fourth Day of January, 1994

Attest:

BRUCE LEHMAN

Attesting Officer

Commissioner of Patents and Trademarks